United States Patent
Hsu et al.

(10) Patent No.: US 6,693,769 B2
(45) Date of Patent: Feb. 17, 2004

(54) HIGH DATA RATE WRITE HEAD

(75) Inventors: Yimin Hsu, Sunnyvale, CA (US); Hugo Alberto Emilio Santini, San Jose, CA (US); Neil Smith, San Jose, CA (US); Mason Lamar Williams, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 228 days.

(21) Appl. No.: 09/884,608

(22) Filed: Jun. 18, 2001

(65) Prior Publication Data

US 2002/0191349 A1 Dec. 19, 2002

(51) Int. Cl.[7] .............................. G11B 5/147; G11B 5/39
(52) U.S. Cl. ........................................ 360/126; 360/317
(58) Field of Search ................................ 360/126, 317, 360/123, 120; 29/603.13, 603.14, 603.15

(56) References Cited

U.S. PATENT DOCUMENTS

| | | | | |
|---|---|---|---|---|
| 5,018,038 A | * | 5/1991 | Nakanishi | 360/126 |
| 5,155,646 A | * | 10/1992 | Fujisawa et al. | 360/126 |
| 5,157,570 A | * | 10/1992 | Shukovsky et al. | 360/126 |
| 5,684,660 A | | 11/1997 | Gray et al. | 360/126 |
| 5,793,577 A | | 8/1998 | Katz et al. | 360/126 |
| 5,909,346 A | | 6/1999 | Malhotra et al. | 360/126 |
| 5,995,342 A | | 11/1999 | Cohen et al. | 360/126 |
| 5,996,213 A | | 12/1999 | Shen et al. | 29/603.15 |
| 6,008,969 A | | 12/1999 | Imai et al. | 360/126 |
| 6,043,959 A | | 3/2000 | Crue et al. | 360/113 |
| 6,055,138 A | | 4/2000 | Shi | 360/126 |
| 6,259,583 B1 | * | 7/2001 | Fontana et al. | 360/126 |
| 6,317,288 B1 | * | 11/2001 | Sasaki | 360/126 |
| 6,333,841 B1 | * | 12/2001 | Sasaki | 360/317 |
| 6,483,665 B1 | * | 11/2002 | Sasaki | 360/126 |
| 6,525,903 B1 | * | 2/2003 | Sasaki | 360/126 |
| 2001/0012177 A1 | * | 8/2001 | Crue et al. | 360/126 |
| 2002/0024776 A1 | * | 2/2002 | Sasaki et al. | 360/317 |
| 2002/0041465 A1 | * | 4/2002 | Sasaki | 360/126 |
| 2003/0053252 A1 | * | 3/2003 | Sasaki | 360/126 |

* cited by examiner

*Primary Examiner*—William Klimowicz
(74) *Attorney, Agent, or Firm*—Ervin F. Johnston

(57) ABSTRACT

A magnetic head assembly includes first and second pole pieces and first and second coil layers wherein the second pole piece has a ferromagnetic pole tip which forms a portion of an air bearing surface and defines a track width of a write head. A write gap layer is located between the first pole piece and the pole tip. A dielectric first insulation layer interfaces first and second side surfaces of the pole tip and is located between the first and second coil layers. The second pole piece has a ferromagnetic second pole piece structure which is magnetically connected to each of the pole tip and the first pole piece and extends across the second coil layer. In a first embodiment the second pole piece structure is a single layer and in a second embodiment the second pole piece structure has front and back components with a flat laminated second pole piece yoke layer located therebetween.

47 Claims, 16 Drawing Sheets

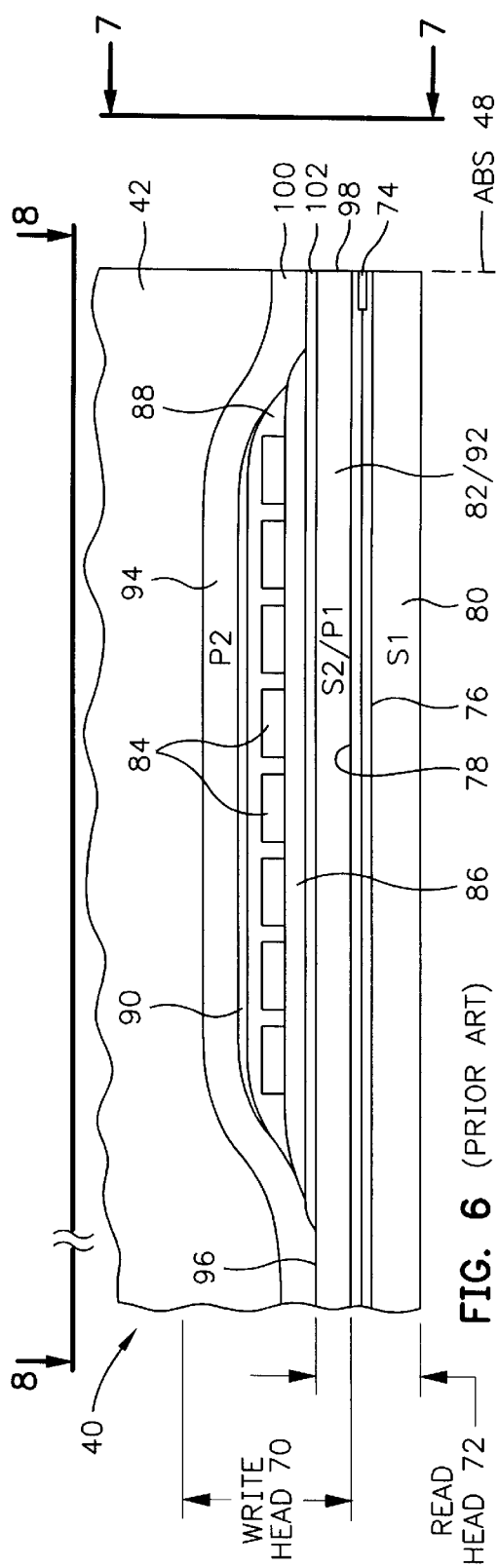
FIG. 6 (PRIOR ART)
FIG. 7 (PRIOR ART)
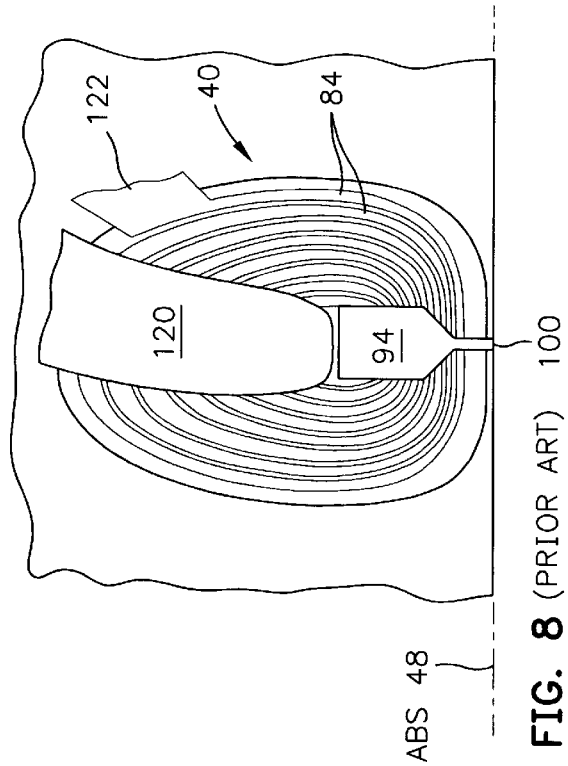
FIG. 8 (PRIOR ART)

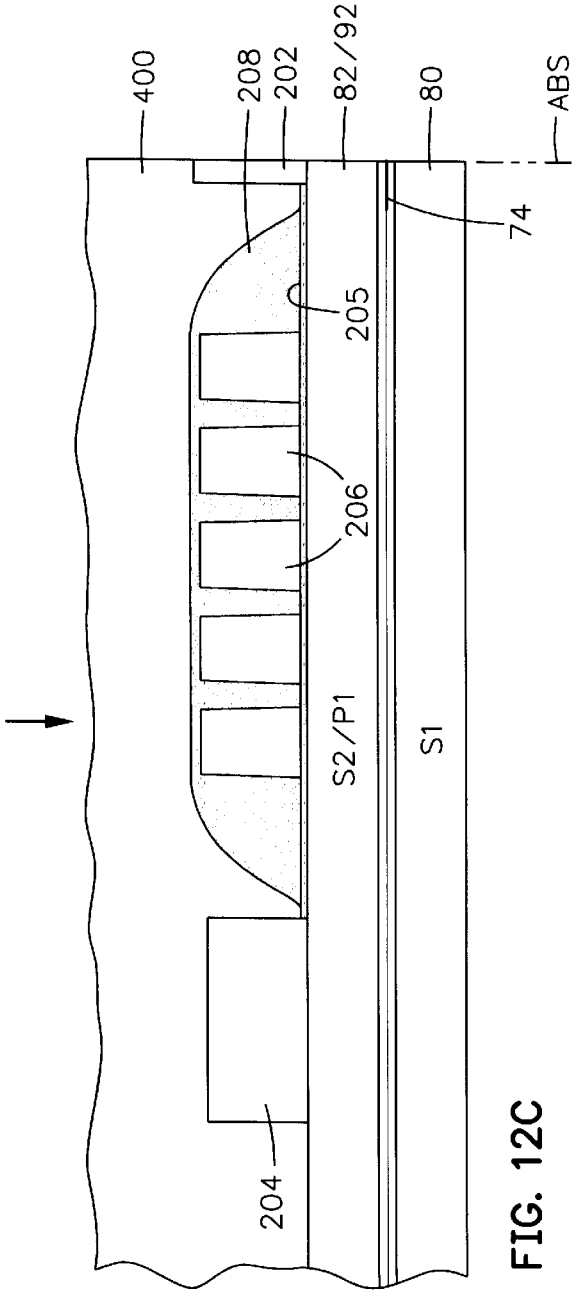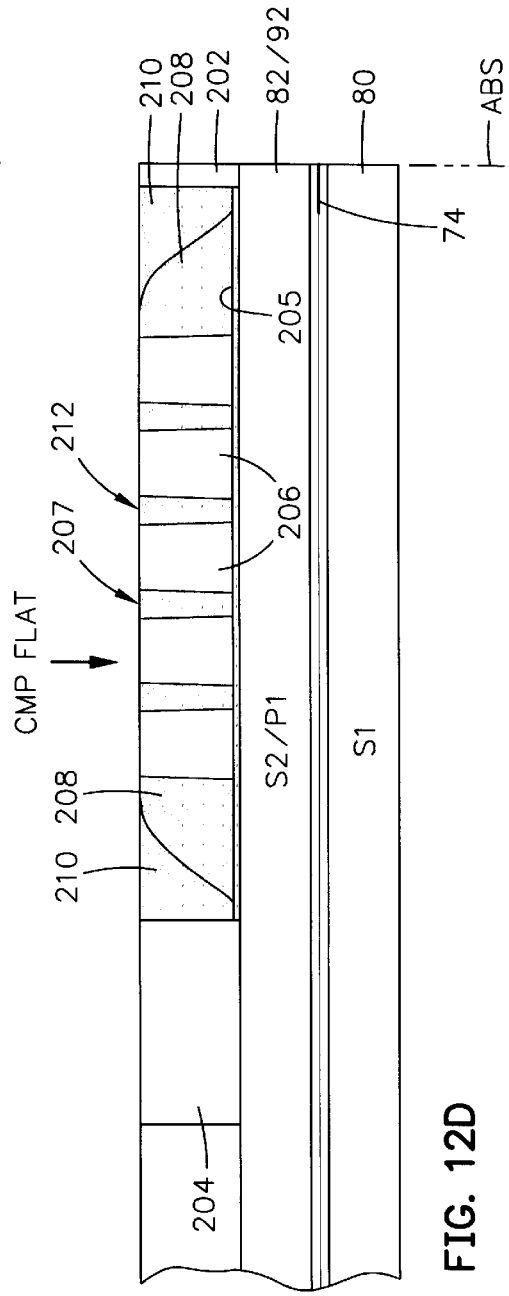
FIG. 12C
FIG. 12D

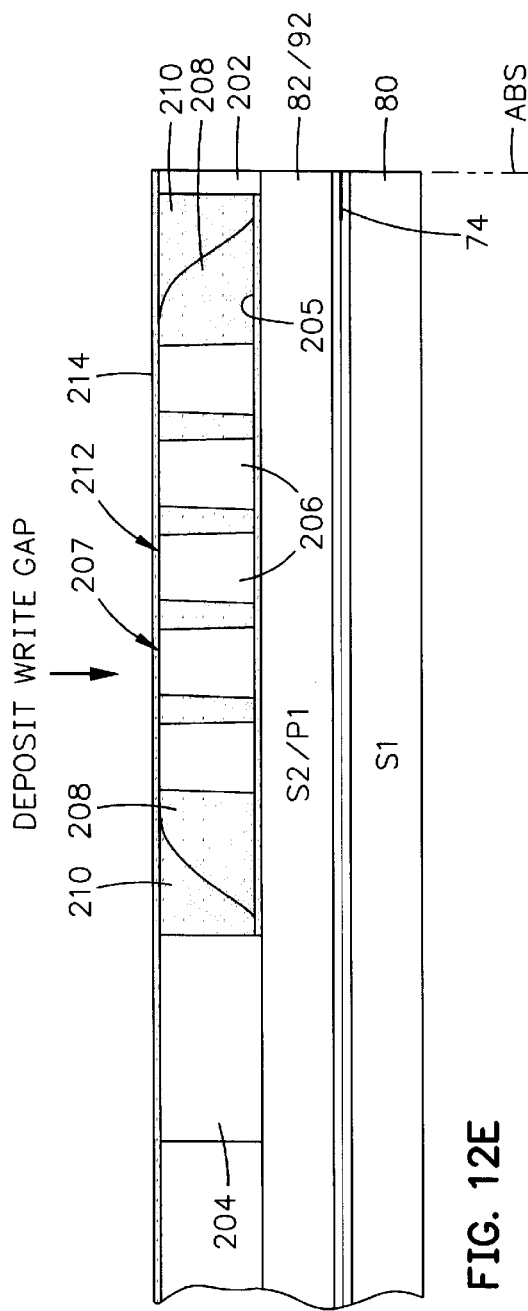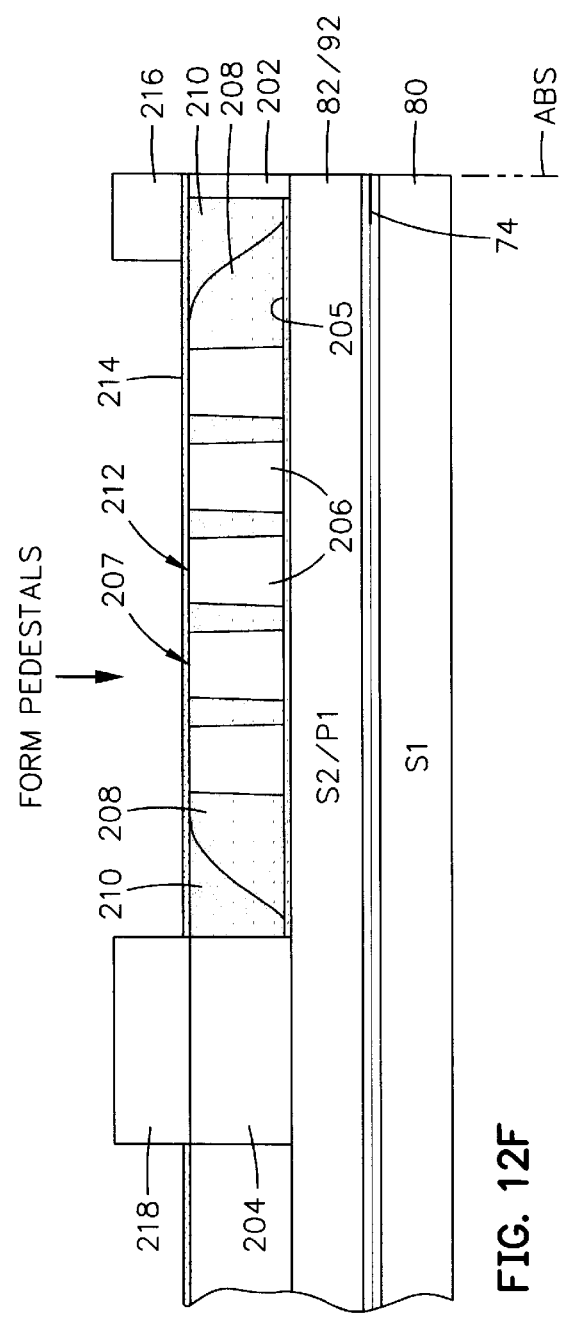

HIGH DATA RATE WRITE HEAD

BACKGROUND OF THE INVENTION

1. Field of the Invention

The present invention relates to a high data rate write head and, more particularly, to a high linear density write head which is short, has double high pitch coils, a major heat sink for each coil and a high aspect ratio well-defined second pole tip.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

A write head typically employs ferromagnetic first and second pole pieces which are capable of carrying flux signals for the purpose of writing magnetic impressions into a track on a magnetic medium, such as a rotating magnetic disk. Each of the first and second pole pieces has a yoke region which is located between a pole tip region and a back gap region. The pole tip region is located at the ABS and the back gap region is spaced from the pole tip region at a recessed location within the write head. At least one coil layer is embedded in an insulation stack which is located between the first and second pole pieces in the yoke region. A nonmagnetic write gap layer is located between the pole tip regions of the first and second pole pieces. The first and second pole pieces are magnetically connected at the back gap. Processing circuitry digitally energizes the write coil which induces flux into the first and second pole pieces so that flux signals bridge across the write gap at the ABS to write the aforementioned magnetic impressions or bits into the track of the rotating disk.

A write head is typically rated by its areal density which is a product of its linear bit density and its track width density. The linear bit density is the number of bits which can be written per linear inch along the track of a rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the thickness of the write gap layer. The thinner the write gap layer, the greater the number of bits the write head can write into the track of the rotating magnetic disk. The track width density is directly dependent upon the width of the second pole tip at the ABS. Efforts over the years to increase the areal density of write heads has resulted in computer storage capacities increasing from kilobytes to megabytes to gigabytes.

The first and second pole pieces, including the second pole tip, are typically fabricated by plating techniques. A strong-felt need is to fabricate second pole tips with submicron widths is limited by the resolution of the fabrication techniques. The second pole tip is typically fabricated by frame plating. Photoresist is employed to provide the frame and a seed layer is employed to provide a return path for the plating operation. A typical sequence of fabricating a second pole tip, as well as other components of the first and second pole pieces, is to sputter clean the wafer, sputter deposit a seed layer, such as nickel iron, on the wafer, spin a layer of photoresist on the wafer, light-image the photoresist layer through a mask to expose areas of the photoresist that are to be removed (assuming that the photoresist is a positive photoresist), develop the photoresist to remove the light-exposed areas to provide an opening in the photoresist at the pole tip region and then plate the second pole tip in the opening up to a desired height.

It is necessary that a second pole tip have sufficient volume at the ABS in order to conduct the required amount of flux for writing the signals into the magnetic disk. If the second pole tip is made thinner, it must be made higher in order to provide the necessary volume of magnetic material. Unfortunately, as the track width becomes narrower the resolution of the photoresist decreases. Resolution is quantified as aspect ratio which is the width of the second pole tip divided by the thickness of the photoresist. As the thickness of the photoresist increases the light penetration during the light-imaging step loses its columnation as it travels toward the bottom of the photoresist. The result is that the side walls of the photoresist frame are jagged which results in jagged side walls of the second pole tip.

The aforementioned problems are particularly manifested when the second pole tip and the yoke of the second pole piece are plated simultaneously in a common photoresist frame. In addition to loss of resolution with an increasing height of the second pole tip, there is also notching of the side walls of the photoresist frame, and consequently the second pole tip, due to reflection of light from a seed layer on the insulation stack immediately behind the pole tip region. One method to overcome this problem has been to employ a stitched "T"-shaped second pole piece which is fabricated by first making only the second pole tip portion with a photoresist frame and then subsequently making the yoke portion of the second pole piece with a second photoresist frame with the yoke portion being stitched (magnetically connected) to a stitch region at the top of the second pole tip. This type of second pole piece is referred to as a stitched "T" because the yoke portion extends laterally across the top of the pole tip portion, forming the configuration of a "T". The yoke portion can be stitched across the entire top surface of the second pole tip in which case it is exposed at the ABS or it may be recessed from the ABS, as desired. Unfortunately, processing steps subsequent to the construction of the second pole tip decrease the height of the second pole tip and can seriously damage its side walls.

There is a continuing strong-felt need to increase the aforementioned areal density of the write head. When the linear bit density is increased the data rate of the head is increased and when a more narrow second pole tip is fabricated the track width density is increased. A goal has been to achieve a high data rate of 1 gigabit (Gb) per second. This means that more bits will have to be written by the write head per inch along the length of the track of a rotating magnetic disk. This, in turn, means that the coercivity of the material of the disk will have to be increased in order for the smaller bits along the track to produce a sufficient field so that the field can be sensed by the read head. Coercivity is the amount of applied field required to switch the orientation of the magnetization of the bit from one direction perpendicular to the plane of the disk to the opposite direction. Since coercivity of the magnetic material of a disk must be increased in order to increase the data rate the write head must be capable of producing a higher intensity magnetic field for switching the bits in the magnetic disk from one direction to the other. The different directions represent digital information which is processed to provide intelligent information. In order for the write head to write magnetic bits into the high coercivity disk the write signal of the head must exceed the coercivity of the disk. In order to implement this function the write head must be highly efficient.

One way to increase the data rate is to decrease the pitch of the coil layer. The pitch is the distance across one turn of the coil plus one space between the turn and the next turn. It would be desirable if the coil had a pitch of 1 $\mu$m or less. Unfortunately, when the data rate is increased with a low pitch coil the write head suffers from an increase in heat and increase in eddy currents between the first and second pole pieces. Eddy currents reduce the write current which, in turn, reduces the write signal across the gap of the write head. If the write current is increased in order to increase the write signal the amount of heat generated is increased. When the heat becomes excessive one or more layers of the write head can protrude at the ABS which destroys the write head. This protrusion is caused by high expansion of one or more photoresist layers in the insulation stack of the write head. One way to reduce the eddy currents in the write head is to reduce its length between the ABS and the back gap. This can be accomplished by employing two coil layers which are stacked one above the other. A shorter write head will also minimize flux leakage between the first and second pole pieces. Unfortunately, it has been difficult to fabricate a high pitch second coil layer above the first coil layer because of the profile of the first coil layer. It has been found that even with planarization above the first coil layer that the profile of the first coil layer impacts the fabrication of the second coil layer so that the pitch of the second coil layer has to be increased to prevent shorting between the turns of the second coil layer. Further, while the first coil layer has a heat sink in the layers therebelow, the second coil layer does not have a sufficient heat sink. These problems have seriously restricted the construction of dual coil write heads to achieve high data rates.

Another aspect in the construction of high areal density write heads is the track width density of the head. The track width density depends entirely upon the distance between the first and second side walls of the second pole tip. Frame plating is typically employed to fabricate the second pole tip. When the second pole tip is a separate component of the second pole piece, which is fabricated before the fabrication of the yoke portion of the second pole piece, the first and second side surfaces of the second pole tip can be well-defined. Unfortunately, after forming the second pole tip the first and second side surfaces are seriously altered by subsequent processing steps involved in the fabrication of the second coil layer. Accordingly, in order to achieve high track width density the first and second side surfaces of the second pole tip must be protected after fabrication of the second pole tip.

SUMMARY OF THE INVENTION

The present invention provides a highly efficient high data rate write head which has a narrow track width. The write head has been provided with top and bottom write coils so that the length of the write head can be shortened between the ABS and the back gap. The shortened length reduces eddy currents and flux leakage. A thick insulation layer, which is preferably alumina, is provided between the bottom and top write coils so as to provide an effective heat sink for the top coil. The thick insulation layer is planarized so as to eliminate any profile of the bottom coil being replicated into the top coil. This enables the top coil to be fabricated with a low pitch which will promote a high data rate. Further, both coils are protected immediately after fabrication from subsequent processing steps so that alteration of the coil and/or shorting between the turns of the coils are prevented. In another aspect of the invention the second pole piece yoke is fabricated flat so as to promote a high flux carrying capability. Further, the flat yoke enables the yoke to be laminated with alternate dielectric and ferromagnetic films so as to further reduce eddy currents and reduce the generation of heat.

As stated hereinabove, the write head includes first and second pole pieces and first and second coil layers. One aspect of the invention is to provide the first and second pole pieces with selected ferromagnetic components at the front and back gap regions of the head. In this regard, the second pole piece has a pole tip component which forms a portion of the ABS and a write gap layer which is located between the first pole piece and the pole tip component. The thick insulation layer interfaces first and second side surfaces and a back surface of the pole tip component and is located between the first and second coil layers. The second pole piece has a second pole piece structure which is magnetically connected to the pole tip component and the first pole piece and extends across the second coil layer. The pole tip component has a width at the ABS which defines a track width of the write head. In a preferred embodiment the thick insulation layer is alumina.

In a preferred embodiment the first pole piece has a front pedestal and a back gap component with the bottom coil layer located therebetween. An insulation layer insulates the first coil layer from the first pole piece. Another insulation layer insulates the turns of the first coil layer. The first coil layer and the other insulation layer are planarized so as to form a first coplanar surface. The write gap layer is now located between the pedestal and the pole tip.

In a still further preferred embodiment the second pole piece has a back gap component which is magnetically connected to the back gap component of the first pole piece with the thick insulation layer being located between the pole tip and back gap components of the second pole piece. The pole tip and the back gap components of the second pole piece and the thick insulation layer are planarized so as to form a second coplanar surface. The second pole piece structure is then magnetically connected to the pole tip and back gap components of the second pole piece and extends across the second or top coil layer. Still another insulation layer insulates the second coil layer from the second pole piece structure.

In one embodiment the pole piece structure is a single layer. In another embodiment the pole piece structure has ferromagnetic front and back gap components and a ferromagnetic pole piece yoke. The front and back gap components of the second pole piece structure are magnetically coupled to the pole tip and back gap components respectively of the second pole piece and the front and back gap components of the second pole piece structure and an insulation layer are planarized to form a third coplanar surface. The yoke is formed as a flat layer and is magnetically connected to the front and back gap components of the second pole piece structure and extends across the top coil layer.

An object of the present invention is to provide a highly efficient high data rate write head with a narrow track width.

Another object is to provide a highly efficient write head with high pitch and high resolution top and bottom coil layers, with major heat sinks for each coil layer and a high resolution second pole tip.

Another object is to provide the aforementioned write head with a pole piece yoke which is flat and laminated.

A further object is to provide a method of making the aforementioned write head.

Other objects and attendant advantages of the invention will be appreciated upon reading the following description taken together with the accompanying drawings.

BRIEF DESCRIPTION OF THE DRAWINGS

FIG. 6 is a partial view of the slider and a prior art merged magnetic head as seen in plane 6—6 of FIG. 2;

FIG. 7 is a partial ABS view of the slider taken along plane 7—7 of FIG. 6 to show the read and write elements of the magnetic head;

FIG. 8 is a view taken along plane 8—8 of FIG. 6 with all material above the coil layer and leads removed;

FIG. 12C is the same as FIG. 12B except a thick planarizing layer of alumina has been deposited on the wafer;

FIG. 12D is the same as FIG. 12C except the wafer has been planarized;

FIG. 12E is the same as FIG. 12D except a write gap layer has been formed;

FIG. 12F is the same as FIG. 12E except pole tip and back gap components of a second pole piece have been formed;

DESCRIPTION OF THE PREFERRED EMBODIMENTS

Magnetic Disk Drive

Figure 1:
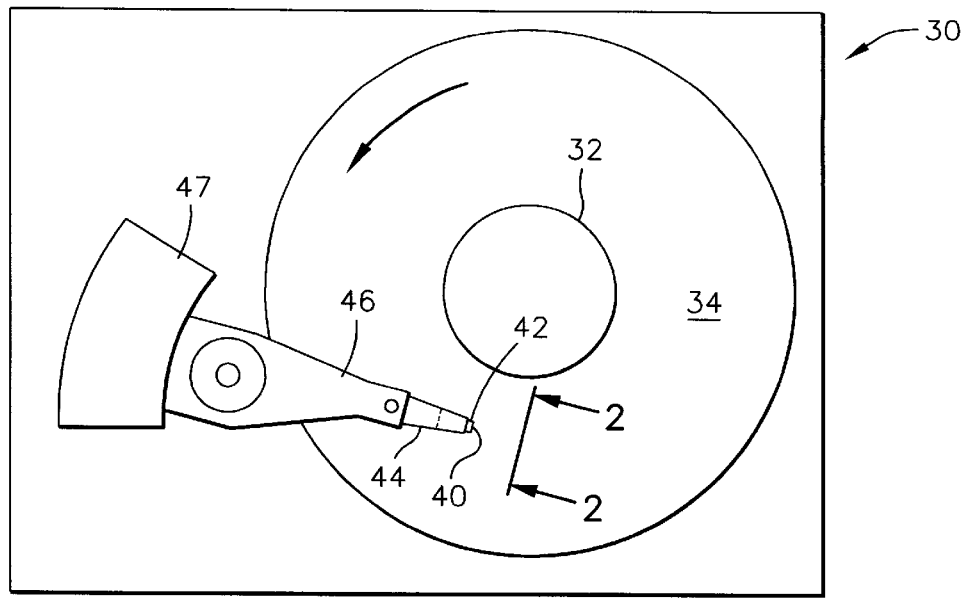
FIG. 1 is a plan view of an exemplary prior art magnetic disk drive.
Figure 2:
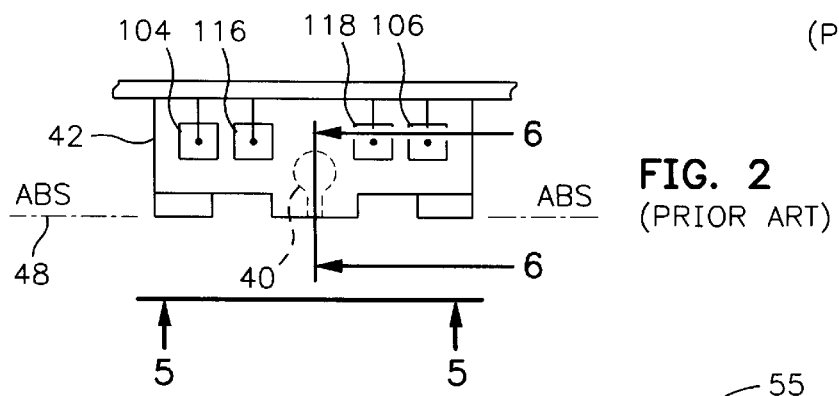
FIG. 2 is an end view of a prior art slider with a magnetic head of the disk drive as seen in plane 2—2 of FIG. 1.
Figure 3:
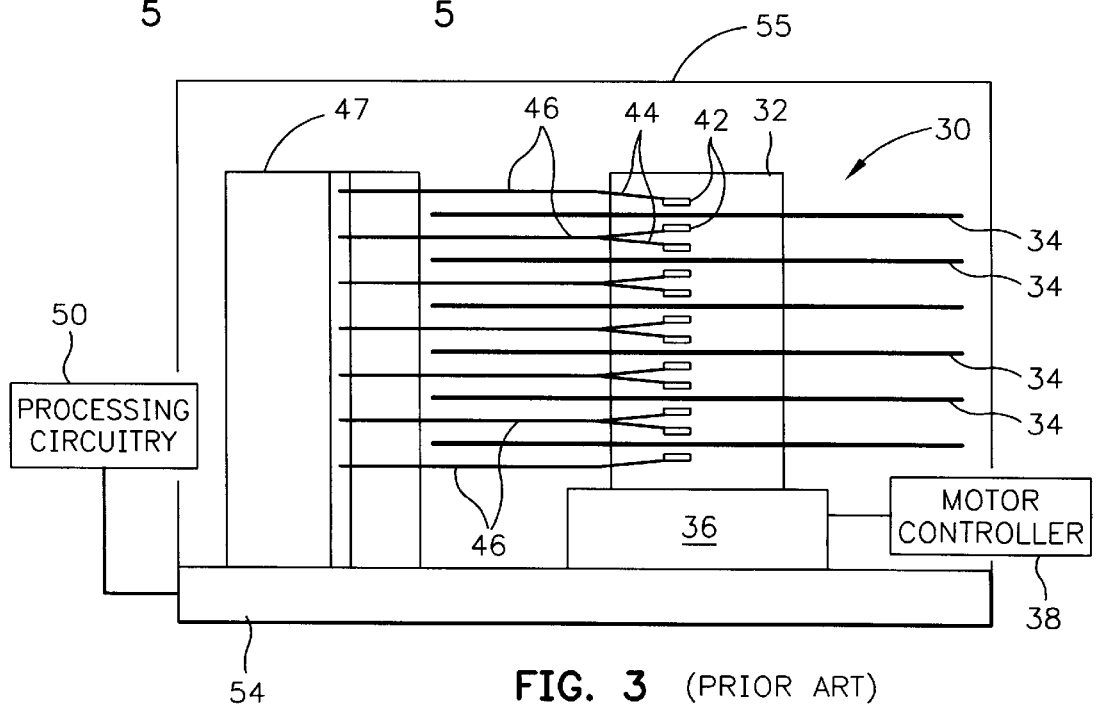
FIG. 3 is an elevation view of the prior art magnetic disk drive wherein multiple disks and magnetic heads are employed.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34.

Figure 4:
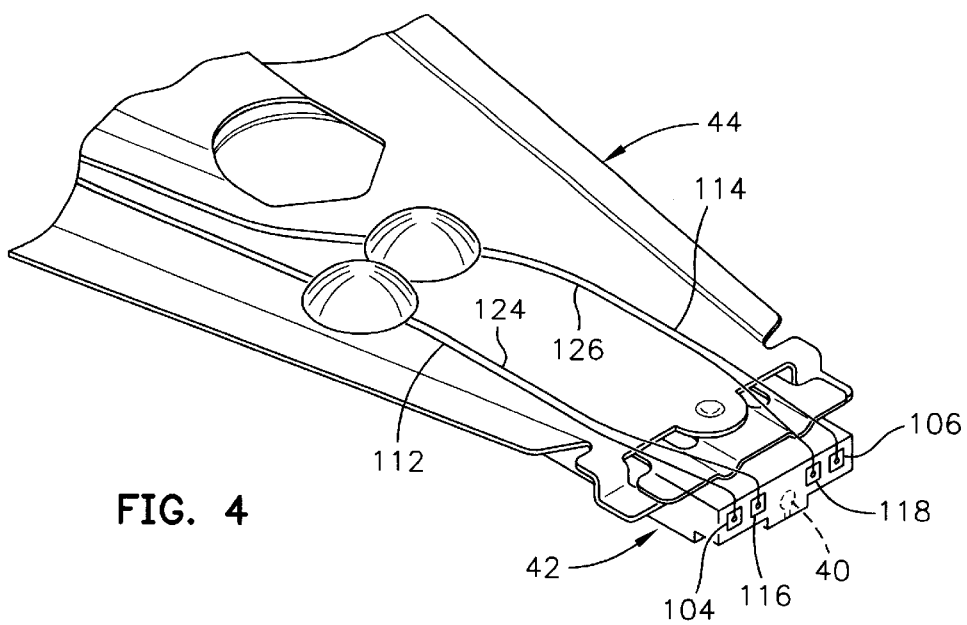
FIG. 4 is an isometric illustration of an exemplary prior art suspension system for supporting the slider and magnetic head.

When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
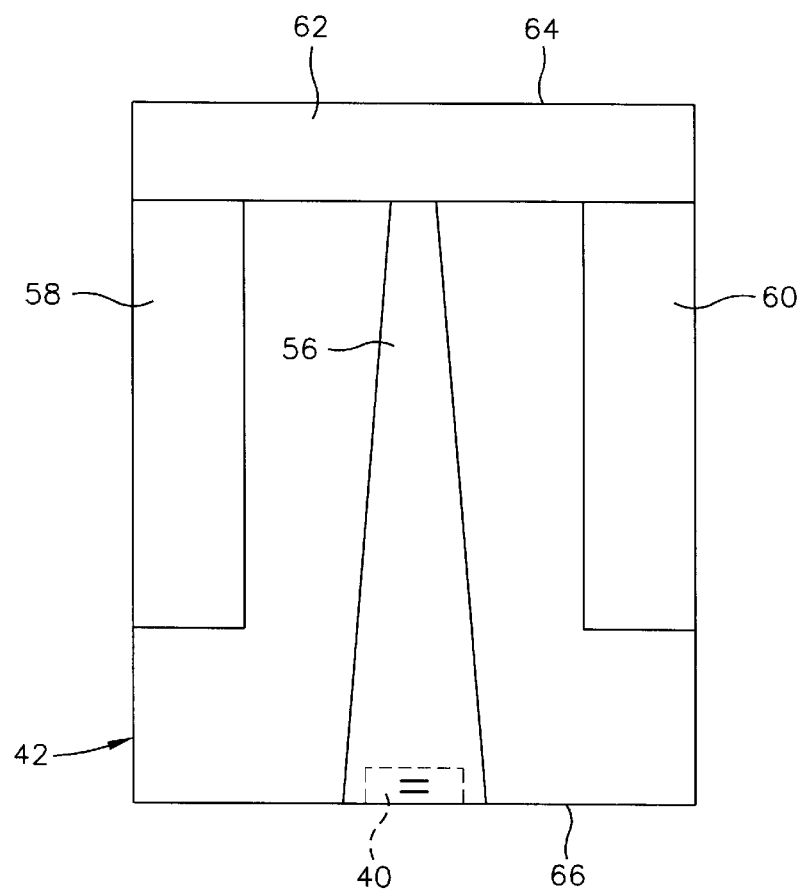
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

FIG. 6 is a side cross-sectional elevation view of a merged magnetic head 40, which includes a write head portion 70 and a read head portion 72, the read head portion employing a sensor 74. FIG. 7 is an ABS view of FIG. 6. The sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the sensor 74 changes. A sense current $I_s$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head these layers are separate layers which are separated by an insulation layer. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9A:
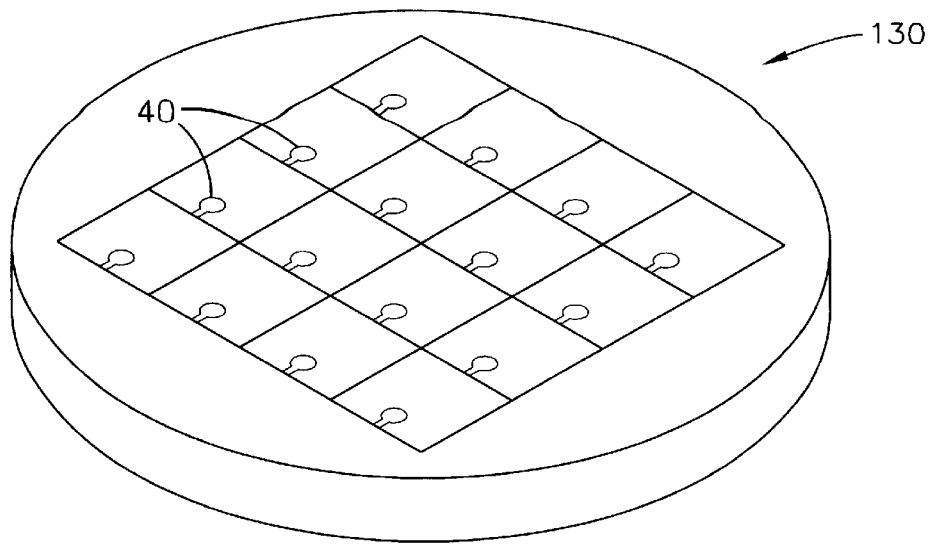
FIG. 9A is an isometric illustration of a wafer and rows and columns of magnetic heads fabricated thereon.
Figure 9B:
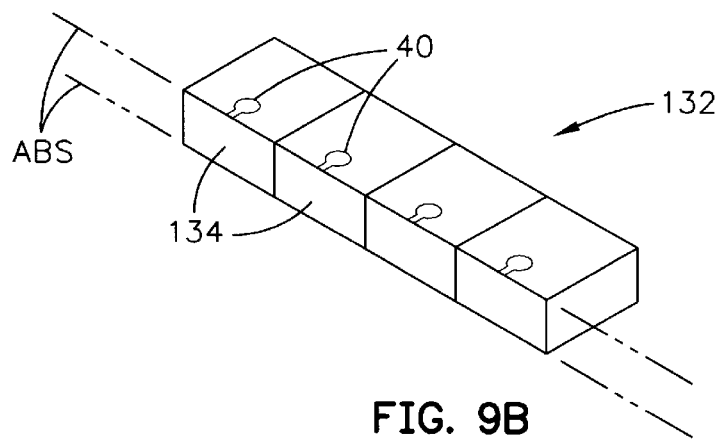
FIG. 9B is an isometric illustration of one of the rows of magnetic write heads from FIG. 9A.
Figure 9C:
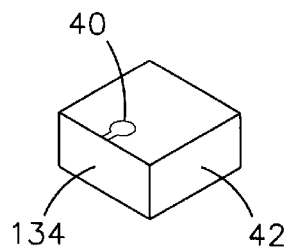
FIG. 9C is one of the magnetic write heads from FIG. 9B.

FIG. 9A is an isometric illustration of a wafer 130 upon which rows and columns of magnetic head assemblies 40 are fabricated. An aspect of the invention, which will be described in more detail hereinafter, is planarizing the wafer at various stages during fabrication of the layers of the head assemblies. This involves depositing a thick layer of alumina on the wafer followed by chemical mechanical polishing (CMP) which polishes the alumina layer flat along with other layers in the head assemblies. After completion of the head assemblies 40 on the wafer 130 the wafer is diced into individual rows, one row 132 being illustrated in FIG. 9B. The surface 134 of the row 132 is then lapped, which is a grinding process, to form the aforementioned ABS. After lapping, the row 132 is then diced into individual magnetic heads 40, one of which is illustrated in FIG. 9C. The slider 42, which supports the magnetic head 40, is then mounted on a suspension as shown in FIG. 4.

The Invention

Figure 10A:
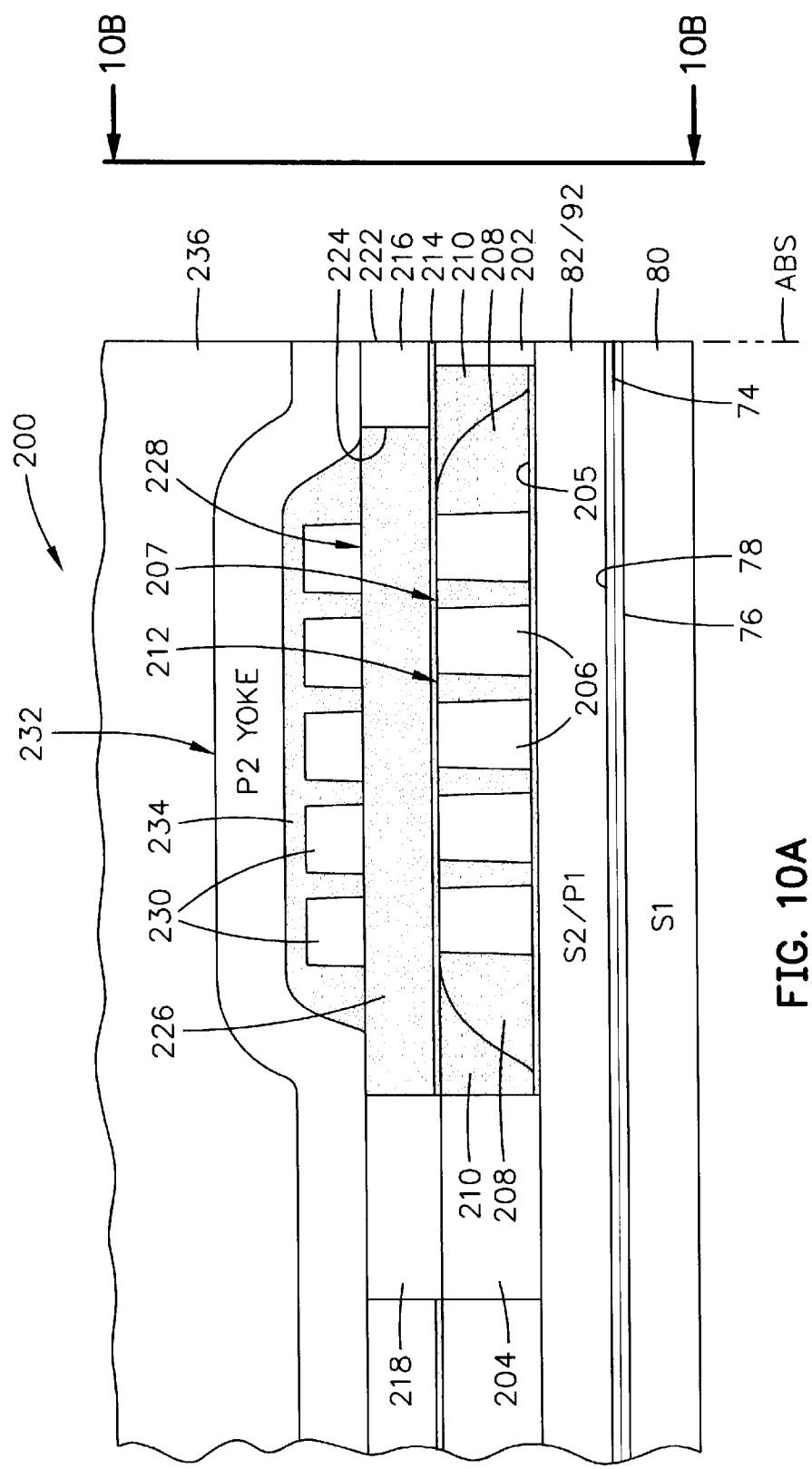
FIG. 10A is a longitudinal cross-sectional view of a first embodiment of the present invention.
Figure 10B:
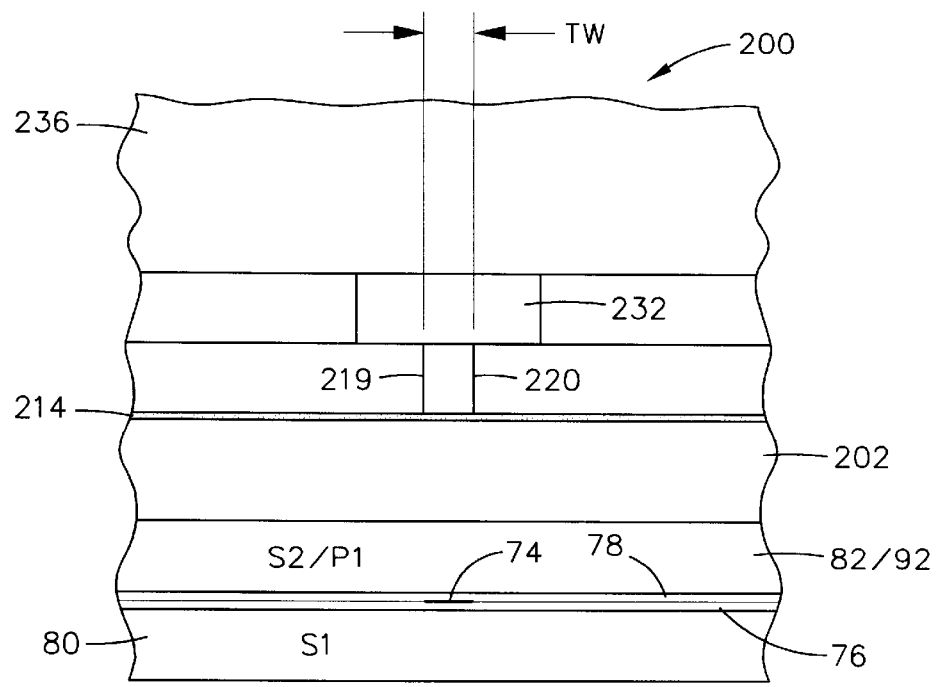
FIG. 10B is a view taken along plane 10B—10B of FIG. 10A.

FIGS. 10A and 10B illustrate a magnetic head assembly 200 which is a first embodiment of the present invention. The magnetic head assembly 200 includes a combined read head and write head. The read head may include the aforementioned sensor 74 located between first and second read gap layers 76 and 78. The read gap layers 76 and 78 are, in turn, located between first and second shield layers 80 and 82. As discussed hereinabove, the second shield layer 82 may also serve as a first pole piece layer 92 for the write head. Also as discussed hereinabove, optionally a separate layer (not shown) may be used as a first pole piece layer for the write head with a dielectric isolation layer located between the first pole piece layer and the second shield layer 82.

In addition to the first pole piece layer 92, the first pole piece of the write head includes a pedestal 202, which is located at and forms a portion of the ABS, and a back gap component 204 which is located at the back gap. Between the pedestal 202 and the back gap component 204 is located a dielectric insulation layer 205 which is located on the first pole piece layer 82. On the insulation layer 205 is a first write coil layer 206 which is also located between the pedestal 202 and the back gap component 204. An insulation layer 207 insulates the turns of the write coil 206 from one another as well as insulating the write coil from the pedestal 202 and the back gap component 204. In a preferred embodiment the insulation layer 207 includes a hard baked photoresist film 208 which insulates the write coil 206 between its turns and an alumina layer 210 which farther insulates the write coil from the pedestal 202 and the back gap component 204. At this stage the write head is planarized so that the pedestal 202, the back gap component 204, the write coil 206, the hard baked photoresist 208 and the alumina layer 210 form a first coplanar surface 212. The first coplanar surface 212 has a middle region which is located between front and back gap regions. A write gap layer 214 extends over the entire wafer except at the back gap component 204. Accordingly, the write gap layer is directly on a top surface of the pedestal 202 and directly on top of a top surface of the write coil layer 206.

The second pole piece has a pole tip 216 which is located on the front region of the write gap layer and a back gap component 218 which is magnetically connected to the back gap component 204 of the first pole piece. The pole tip 216 has first and second side walls 219 and 220, as shown in FIG. 10B, which are spaced apart by a width which defines a track width (TW) of the write head. The pole tip 216 also has a front surface 222 at the ABS which transfers the flux to the pedestal 202 of the first pole piece and a back surface 224 which is recessed within the head. Located between the pole tip 216 and the back gap component 218 is a dielectric thick insulation layer 226. Again at this stage, the write head is planarized with top surfaces of the pole tip 216, the back gap component 218 and the thick insulation layer 226 forming a second coplanar surface 228. The second coplanar surface 228 has a middle region which is located between a front region and a back gap region. A second write coil 230 is located on the middle region of the second coplanar surface generally directly above the first write coil layer 206.

The second pole piece further includes a second pole piece structure 232 which is magnetically connected to the pole tip 216 in the front region and to the back gap component 218 in the back gap region. In a preferred embodiment a hard baked photoresist layer 234 insulates between the turns of the write coil 230 and between the write coil and the second pole piece structure 232 which extends thereacross. On top of the second pole piece structure 232 an overcoat layer 236 is formed for protecting the write head. It is important to note that the thick insulation layer 226 interfaces the first and second side surfaces 219 and 220 of the pole tip 216, which will be described in more detail hereinafter.

Figure 11B:
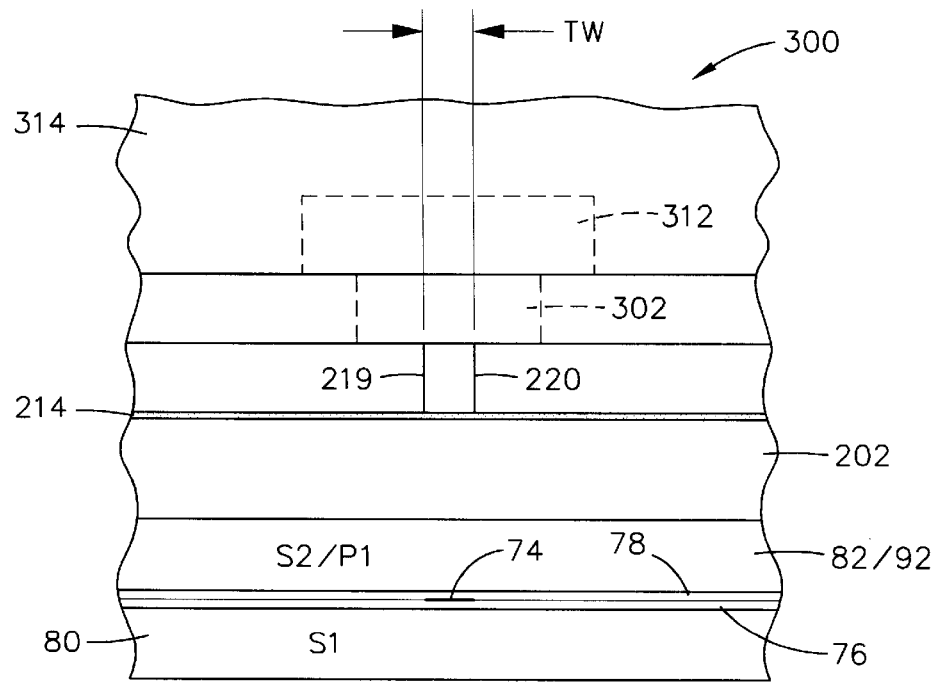
FIG. 11B is a view taken along plane 11B—11B of FIG. 11A.
Figure 11A:
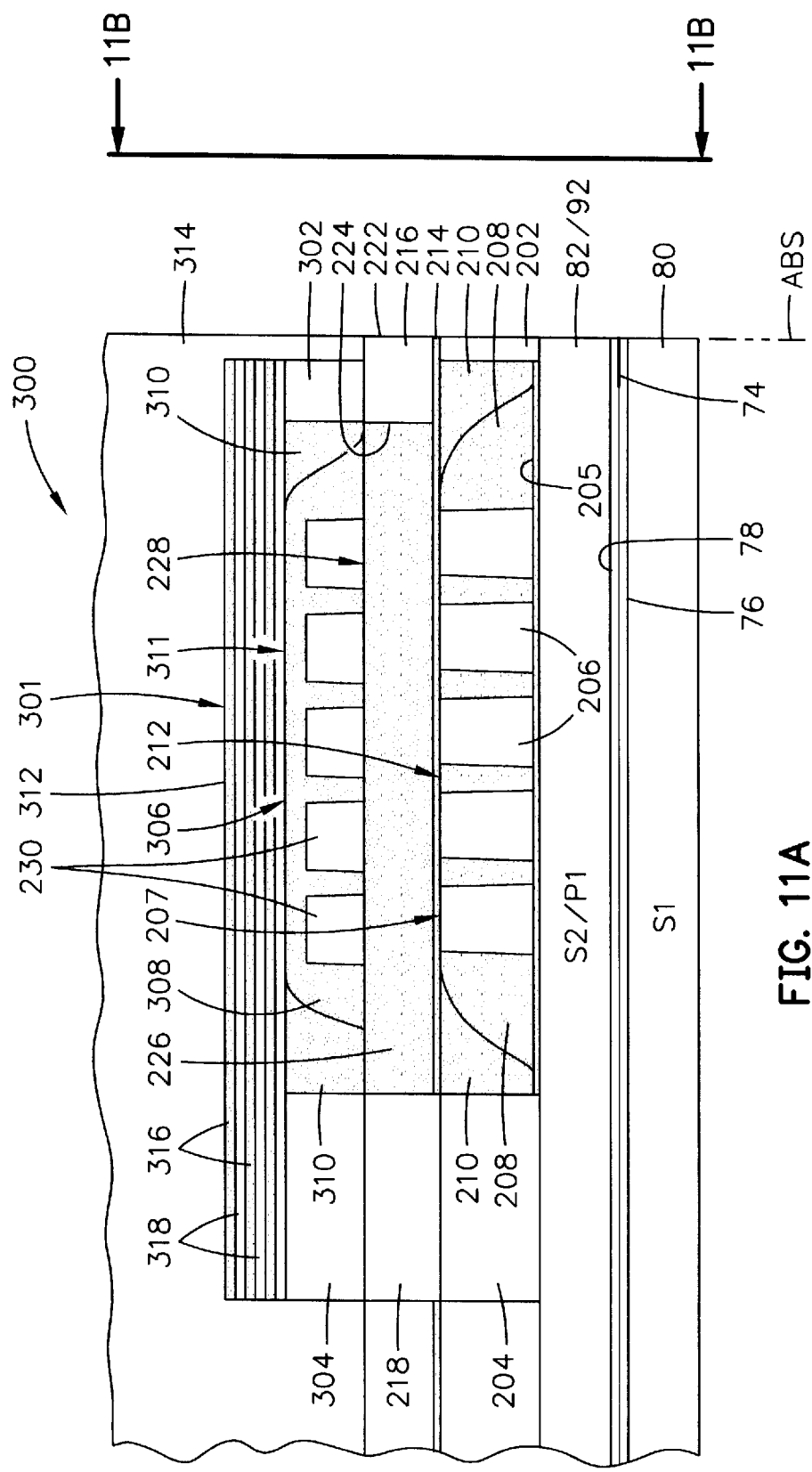
FIG. 11A is a longitudinal cross-sectional view of a second embodiment of the present invention.

The second embodiment of the present head assembly 300 is illustrated in FIGS. 11A and 11B. This embodiment is the same as the embodiment 200 in FIGS. 10A and 10B except for the write head portion above the second coplanar surface 228. As stated hereinabove, the second coplanar surface 228 has a middle portion which is located between a front portion and a back gap portion. In the embodiment 300 the second pole piece structure has a ferromagnetic front component 302 which is magnetically connected to the pole tip 216 in the front region and a ferromagnetic back gap component 304 which is magnetically connected to the back gap component 218. The second write coil layer 230 may be located directly on the thick insulation layer 226 between the front and back components 302 and 304. A dielectric insulation layer 306 insulates between the turns of the write coil layer 230 and insulates the write coil layer from the front and back gap components 302 and 304. In a preferred embodiment the insulation layer 306 includes a hard baked photoresist film 308 which insulates between the turns of the write coil 230 and an alumina film 310 which insulates the write coil layer from the front and back gap components 302 and 304. At this stage the write head assembly is again planarized. The front and back gap components 302 and 304, the hard baked photoresist layer 308 and the alumina layer 306 are planarized to form a third coplanar surface 311. The coplanar surface 311 is located above the top surface of the write coil layer 230 so as to provide insulation thereabove. The third coplanar surface 311 has a middle portion which is located between front and back portions. The second pole piece structure further includes a yoke 312 which is magnetically connected to the front component 302 in the front portion of the third coplanar surface 311 and is magnetically connected to the back gap component 304 at the back portion of the second coplanar surface. The yoke 302 extends across the second write coil layer 230 and is insulated therefrom by the hard baked photoresist film 308. On top of the yoke 312 is an overcoat layer 314 for protecting the write head.

Discusson

It should be noted that in both embodiments that the thick insulation layer 226 interfaces the first and second side surfaces 219 and 220 of the pole tip 216. The importance of this arrangement will be described in detail hereinafter. It should further be noted that the thick insulation layer 226 separates the second write coil layer 230 from the first write coil layer 206 so that the profile of the first write coil layer will not be replicated into the second write coil layer 230. Further, the thick insulation layer 226 provides a heat sink for the second write coil layer 230. Still further, the thick insulation layer 226 further separates the first and second pole pieces so that there is less flux leakage therebetween. The write head is short between the ABS and the back gap so that there will be less eddy currents to reduce the effectiveness of the write current. Further, the planarization of the heads 200 and 300 at various steps greatly facilitates the construction of smaller high resolution components which will be explained in detail in the method of making the invention.

Method of Making

Figure 12A:
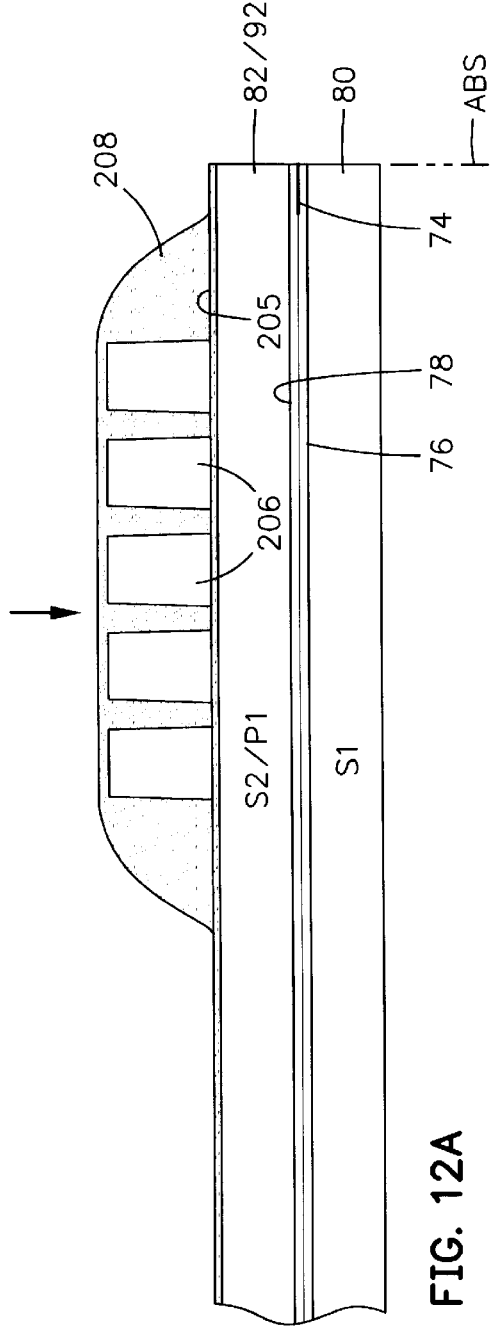
FIG. 12A is a longitudinal cross-sectional view of a partially constructed magnetic head assembly after fabricating a first write coil.

FIGS. 12A–12M illustrate a preferred embodiment of making the write head shown in FIGS. 10A and 10B. As shown in FIG. 12A the read head includes the sensor 74 which is located between the first and second read gap layers 76 and 78. The read gap layers 76 and 78 are, in turn, located between first and second shield layers 80 and 82. In a merged magnetic head the second shield layer also serves as a first pole piece layer 92 for the write head. Optionally, a second ferromagnetic layer (not shown) may be employed for the first pole piece layer, as discussed hereinabove, for a piggyback type of head.

Figure 12B:
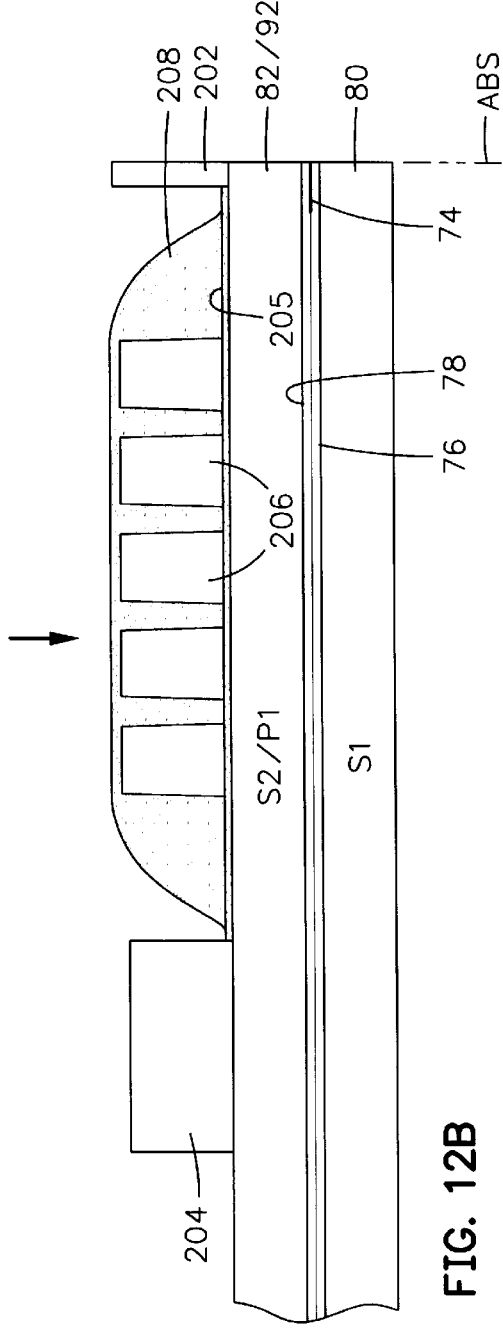
FIG. 12B is the same as FIG. 12A except a pedestal and a back gap component of a first pole piece have been fabricated.

In FIG. 12A a dielectric insulation layer 205, which may be alumina, is sputter deposited on the wafer. Next a seed layer (not shown), which may be copper, is sputtered on the wafer and a first coil layer 206 is frame plated. Only the front portion of the coil layer is shown in FIG. 12A. In FIG. 12A a hard baked photoresist film 208 is formed over the coil layer 206 protecting it from subsequent processing steps. As shown in FIG. 12B, front and back portions of the insulation layer 205 are removed, such as by ion milling or sputter etching, and the first pole piece is formed with a pedestal 202 and a back gap component 204. The pedestal 202 and the back gap component 204, which may be fabricated by frame plating, are magnetically coupled to the first pole piece layer 92 with a front surface of the pedestal 202 forming a portion of the ABS. It should be noted that the coil 206 can be fabricated with low pitch and high resolution since the insulation layer 205 provides a planar surface and the photoresist 208 protects the coil layer from subsequent processing steps. If desired, before forming the insulation layer 205 the wafer may be planarized by chemical mechanical polishing (CMP).

In FIG. 12C a planarizing film of alumina 400 is formed on the wafer, such as by sputter deposition, with a height above the top surfaces of the pedestal 202 and the back gap component 204. In FIG. 12D the wafer is chemically mechanically polished to planarize the wafer with top surfaces of the first and second pedestals 202, 204, an alumina film 210, the photoresist film 208 and the coil layer 206 forming a first coplanar surface 212 which has a middle portion located between front and back portions. While not preferred, the pedestal 202 and the back gap component 204 may be formed before the coil layer 206 and the photoresist film 208 and the alumina film 210 may be a single layer of alumina sputter deposited and planarized by CMP.

Figure 12G:
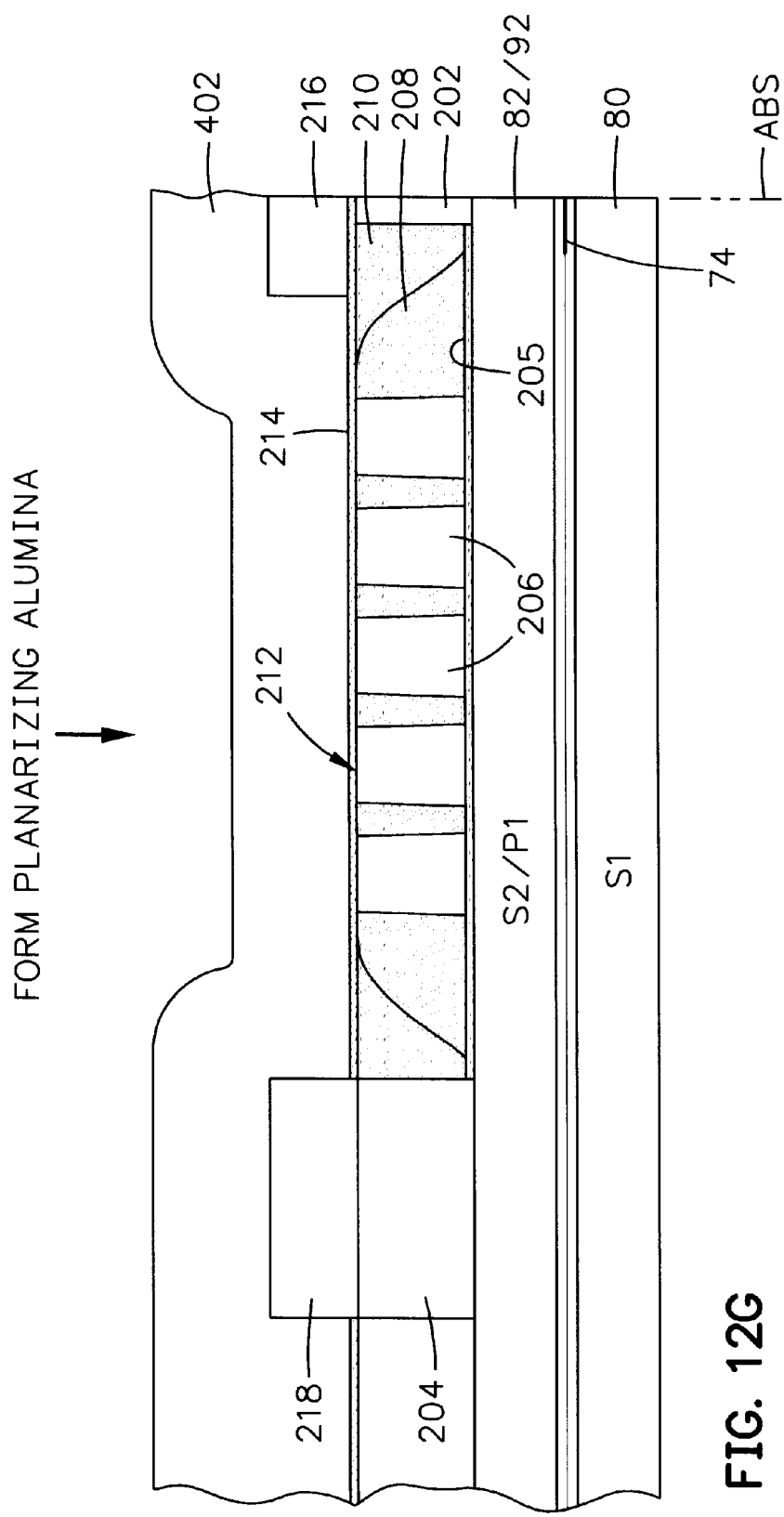
FIG. 12G is the same as FIG. 12F except a thick planarizing layer of alumina has been deposited.
Figure 12H:
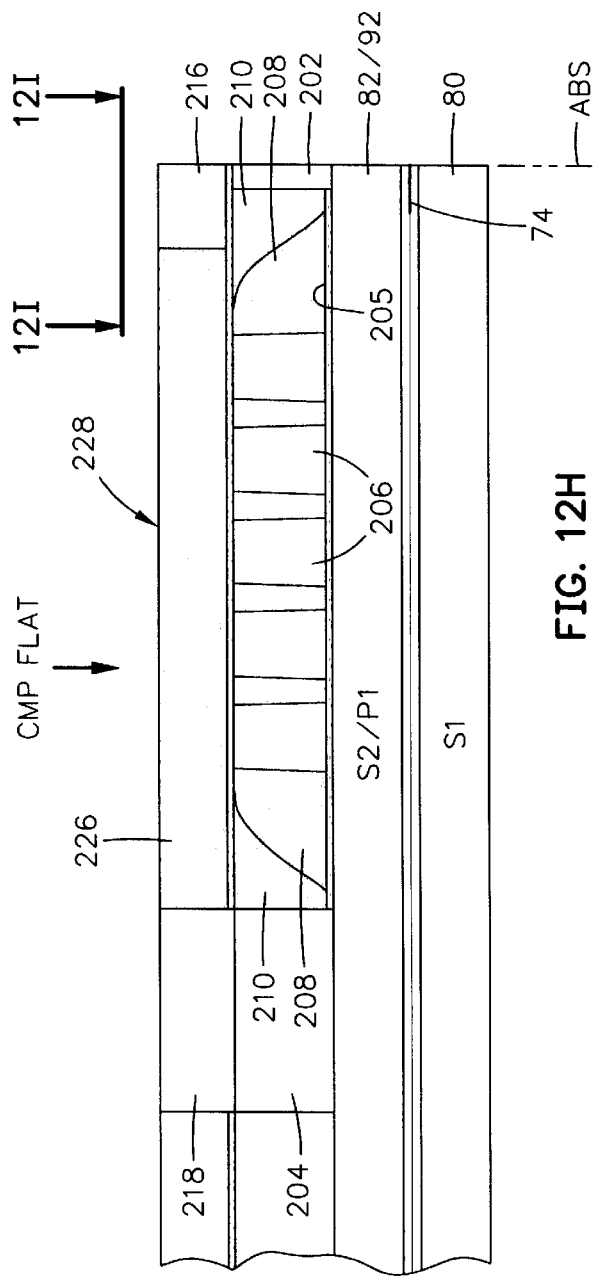
FIG. 12H is the same as FIG. 12G except the wafer has been planarized.

In FIG. 12E a write gap layer 214, which may be sputtered alumina, is formed on the front and middle portions of the first coplanar surface 212. The write gap layer may be deposited over the entire wafer and then etched away in the back gap regions of each head assembly on the wafer. The second pole piece is then provided with a pole tip 216 and a back gap component 218 which may be formed by frame plating. The pole tip 216 is separated from the pedestal 202 by the write gap layer 214 at the ABS and the back gap component 218 is magnetically connected to the back gap component 204. It should be noted that the pole tip 216 defines the track width (TW) of the write head, which will be discussed in more detail hereinafter. In FIG. 12G another planarizing layer of alumina 402 is sputter deposited on the wafer with a height above the top surfaces of the pole tip 216 and the back gap component 218. In FIG. 12H the planarizing layer 402 is chemically mechanically polished until top surfaces of the pole tip 216, the alumina layer 226 and the back gap component 218 form a second coplanar surface 228 which has a middle portion located between front and back portions.

Figure 12I:
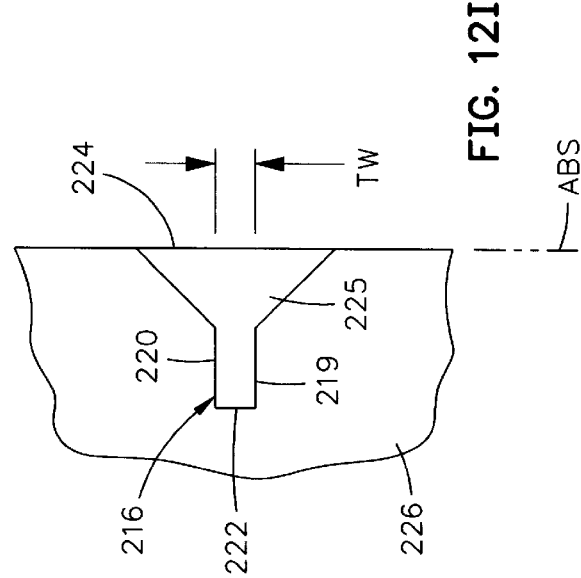
FIG. 12I is a view taken along plane 12I—12I of FIG. 12H.

As shown in FIG. 12I, the pole tip 216 has first and second side walls 219 and 220 and front and back surfaces 222 and 224 with the front surface 222 forming a portion of the ABS. The pole tip 216 also has a flared region 225 which serves as a stitch area where the second pole piece component 232 in FIG. 10A can be magnetically connected for ensuring a good transfer of flux therebetween. The first and second side surfaces 219 and 220 are spaced apart by a width that defines the track width (TW) of the write head. Since the wafer was planarized before the fabrication of the pole tip 216 the pole tip can be fabricated with a very narrow track width. This is because the photoresist employed in the frame plating of the pole tip 216 need only be a slight height above the desired height of the pole tip and there is no sloping surfaces adjacent the pole tip to reflect light into the patterned area of the pole tip. Next, it should be noted that the only alteration of the side walls 219 and 220 of the pole tip is caused by removal of the seed layer (not shown) employed in frame plating the pole tip 216 and the back gap component 218. Accordingly, after removal of the seed layer (not shown), the side walls 219 and 220 of the pole tip 216 are protected by the alumina layer 226 before any further processing steps are performed.

Figure 12J:
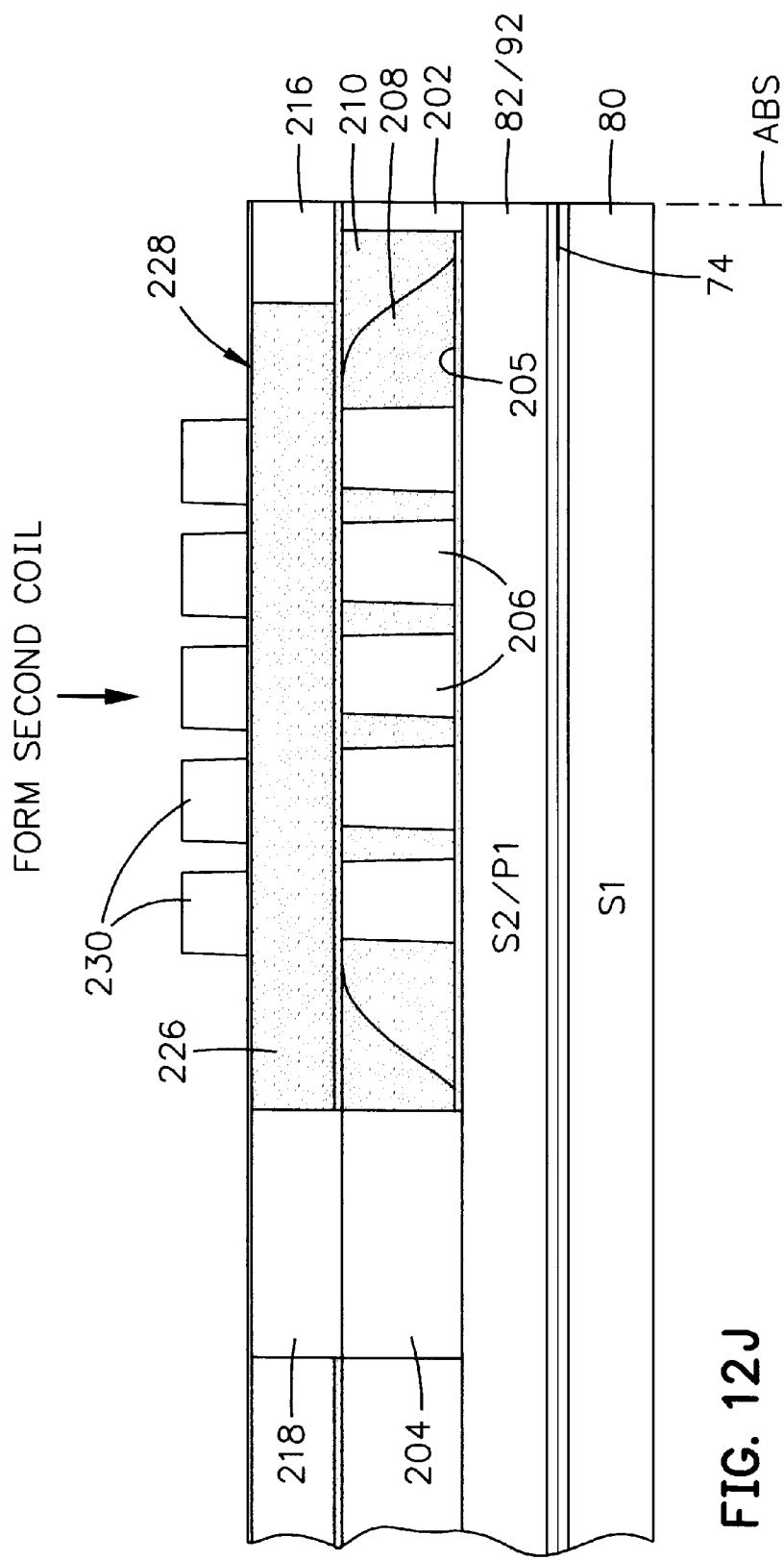
FIG. 12J is the same as FIG. 12H except a second write coil layer has been fabricated.
Figure 12K:
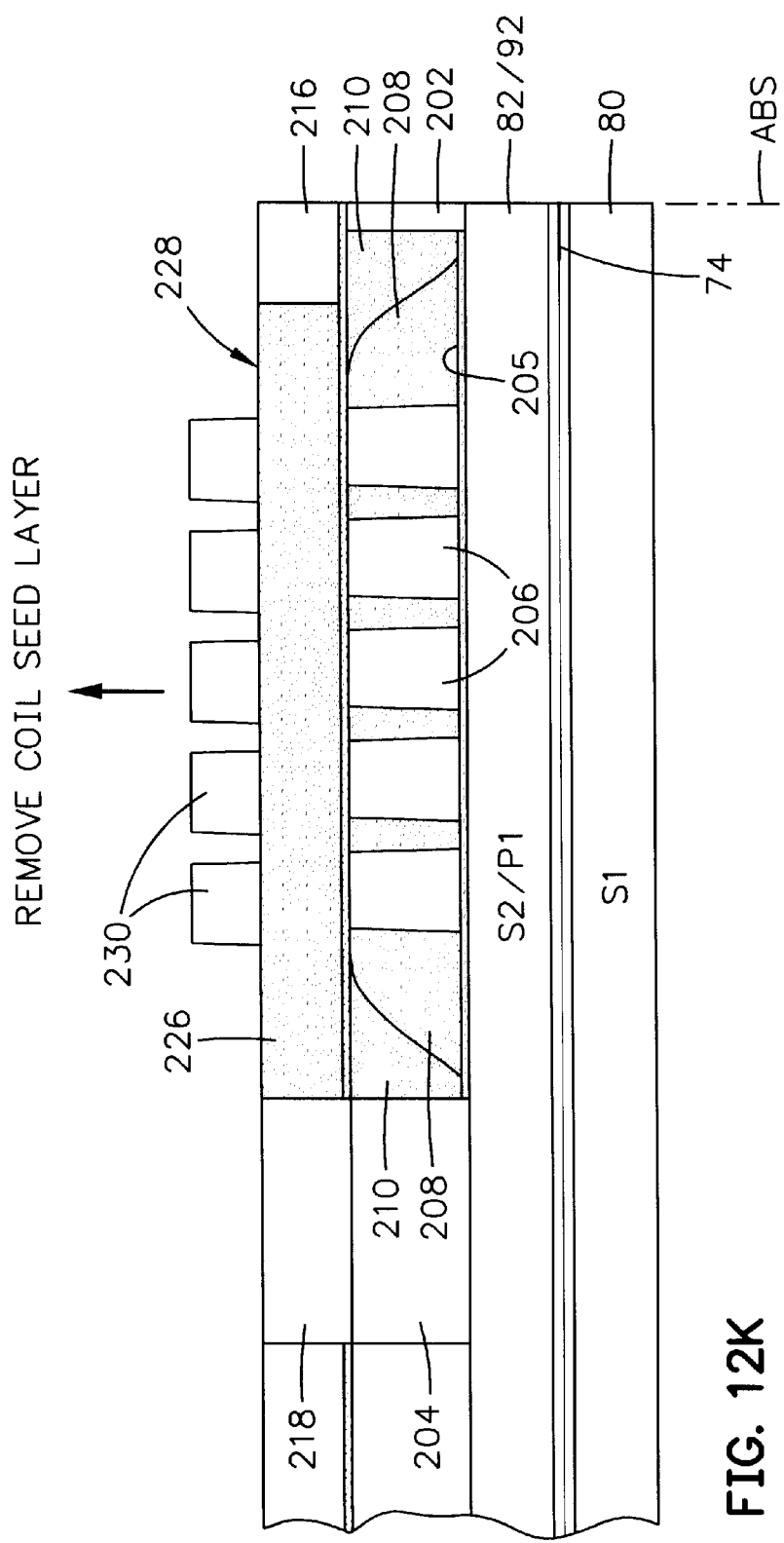
FIG. 12K is the same as FIG. 12J except a seed layer has been removed.

As shown in FIG. 12J, a second write coil layer 230 is frame plated on the alumina layer 226, which is at a middle portion of the coplanar surface 228. In FIG. 12K a seed layer (not shown) employed in the frame plating of the coil layer 230 is removed by ion milling or sputter etching in the same manner as discussed for the first write coil layer 206. It should be noted that the second write coil layer can be also constructed with low pitch and high resolution since it is fabricated on the third coplanar surface 228 and the only alteration will be due to the removal of the seed layer in FIG. 12K. An important aspect of the invention, however, is that the profile of the first write coil layer 206 is not replicated into the second write coil layer 230 because of the thick alumina layer 226 therebetween.

Figure 12L:
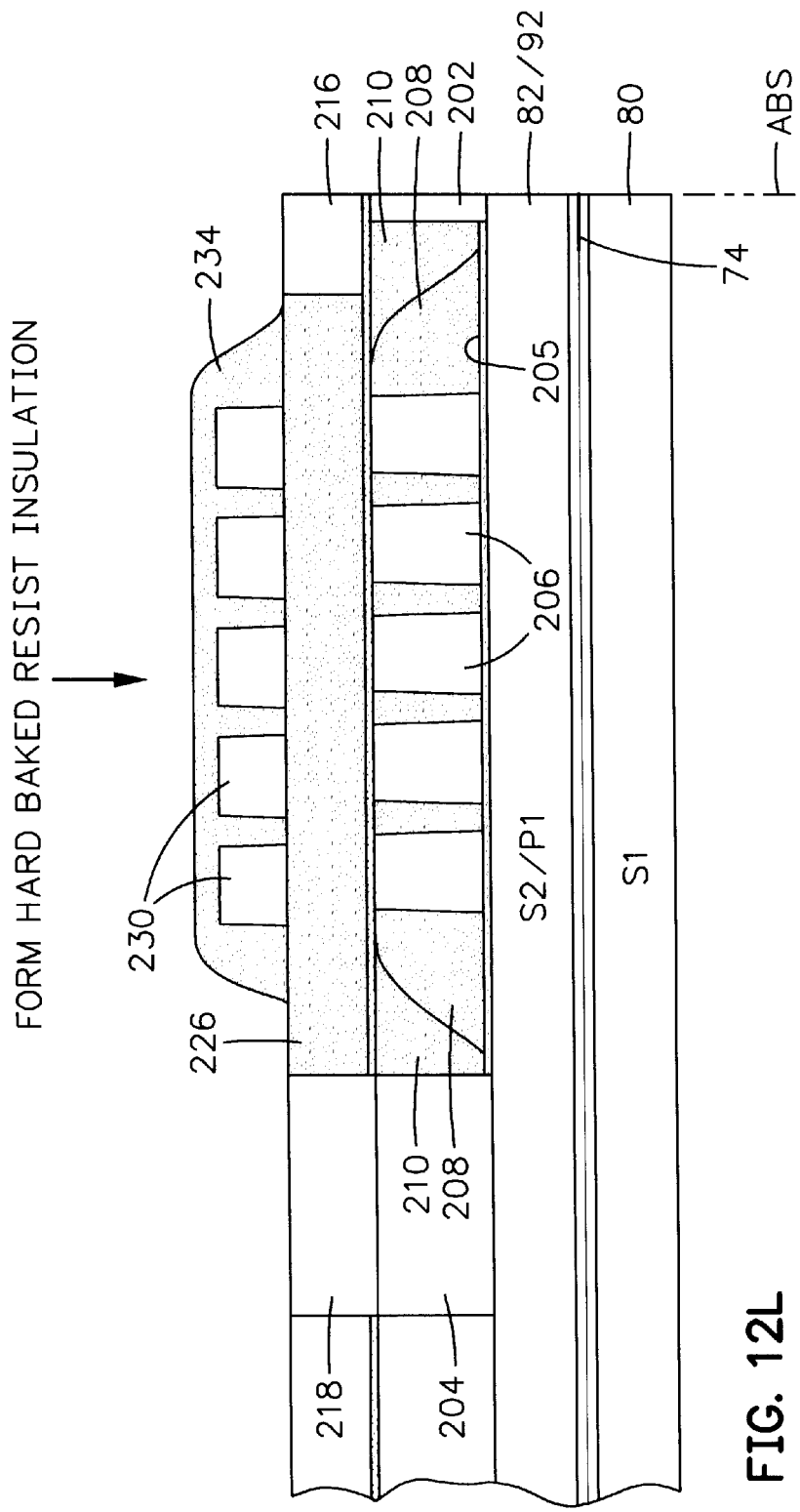
FIG. 12L is the same as FIG. 12K except a hard baked resist insulation layer has been formed.
Figure 12M:
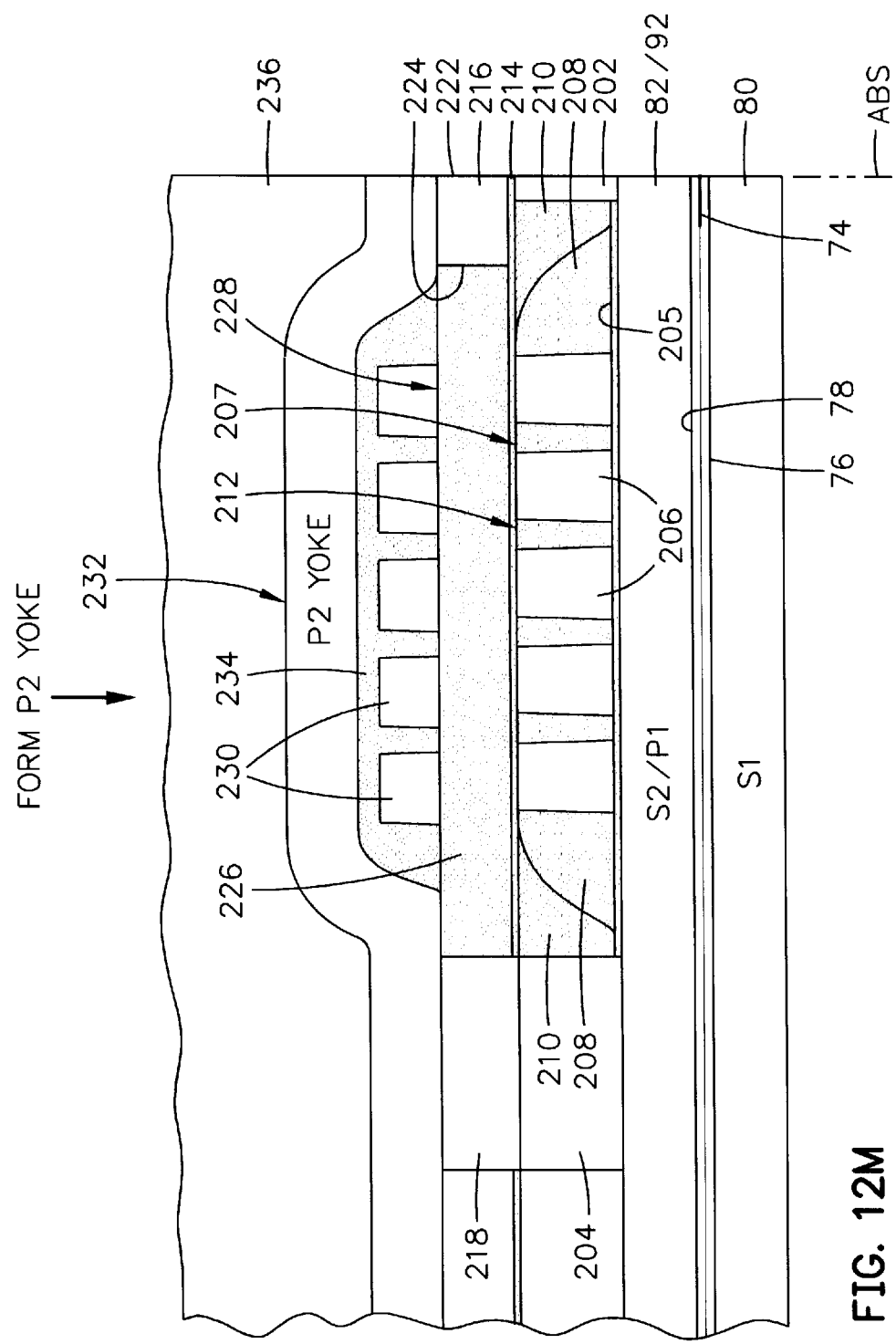
FIG. 12M is the same as FIG. 12L except a second pole piece structure has been formed.

In FIG. 12L a hard baked photoresist layer 234 is formed on top of the second write coil layer 230 so as to insulate all of its surfaces. In FIG. 12M the second pole piece is formed with a second pole piece structure 232 which has a front portion magnetically connected to the pole tip 216, a back gap portion magnetically connected to the back gap component 218 and a yoke portion which extends across and on top of the second write coil 230 with the hard baked photoresist layer 234 providing insulation therebetween. An overcoat layer 236 is then deposited to protect the write head. The heads are then further processed as shown in FIGS. 9A, 9B and 9C. If desired, the front portion of the second pole piece may be recessed from the ABS.

The fabrication of the magnetic head assembly 300 in FIGS. 11A and 11B may include the same steps as shown in FIGS. 12A–12L. Next, the second pole piece may be provided with a second pole piece structure 301 which has a front component 302 and a back gap component 304 which are frame plated so that the front component 302 is magnetically connected to the pole tip 216 and the back gap component 304 is magnetically connected to the back gap component 218. A hard baked photoresist layer 308 is formed on the coil layer 230. A thick alumina layer (not shown), such as that shown at 400 in FIG. 12C, is formed over the entire wafer with the alumina layer having a height above the front and back gap components 302 and 304. Next, the wafer is chemically mechanically polished (CMP) until the top surfaces of the front component 302, the alumina film 310, the hard baked photoresist film 308 and the back gap component 304 form a fourth coplanar surface 306 which has a middle portion between front and back portions. The second pole piece structure is then provided with a yoke 312 which may be frame plated with a front portion magnetically connected to the front component 302, a back gap portion magnetically connected to the back gap component 304 and a middle portion extending across the coil 230 and magnetically insulated therefrom by the photoresist and alumina films 308 and 310. The yoke 312 is fabricated as a flat layer. An aspect of the invention is that the yoke 312 is a lamination of ferromagnetic and alumina films 316 and 318. Because of the flatness of the yoke 312 these films are preferably sputter deposited. The lamination reduces the aforementioned eddy currents so as to increase the write signal. In a preferred embodiment the yoke 312 is also recessed from the ABS. The overcoat layer 314 may be formed by sputter deposition and the magnetic head processed as shown in FIGS. 9A, 9B and 9C. While the insulation layer 306 is preferably separate films of hard baked photoresist and alumina 308 and 310 it should be understood that the insulation layer 306 may be entirely alumina.

Discussion

The preferred materials for the layers are nickel iron ($Ni_{83}Fe_{17}$) for the ferromagnetic layers and copper (Cu) for the write coil layers 205 and 230. The seed layers may be either nickel iron ($Ni_{83}Fe_{17}$) or copper (Cu). Definition of layer portions is typically accomplished by photolithographic techniques (patterned photoresist) and some layer portions are removed by etching or ion milling in the exposed regions of the photoresist. Photoresist, other than hard baked photoresist, is removed by a developer. It should be understood that the invention is not limited to only two write coils, but in other embodiments may include one or more additional coils stacked above the two coils fabricated by the methods described hereinabove. Further, the fabrication steps shown in FIGS. 12A–12M are performed at the wafer level which is shown in FIG. 9A. For convenience, the fabrication in FIGS. 11A–11M are shown only between the ABS and the end of the back gap while in actual practice the magnetic head extends in both directions therefrom as part of the wafer shown in FIG. 9A. The aforementioned insulation layers are composed of a nonmagnetic electrically nonconductive material (dielectric) which is preferably alumina ($Al_2O_3$) or baked photoresist.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head assembly, having a yoke region between front and back gap regions wherein the front region terminates at an air bearing surface (ABS), comprising:

first and second pole pieces;

first and second coil layers in the yoke region;

the second pole piece having a ferromagnetic pole tip component which forms a portion of the ABS and defines a track width of a write head;

a write gap layer located between the first pole piece and the pole tip component;

a dielectric first insulation layer interfacing first and second side surfaces and a back surface of the pole tip component and located between the first and second coil layers;

the second pole piece having a ferromagnetic second pole piece structure extending across the second coil layer and magnetically connected to the pole tip component in the front region and the first pole piece in the back gap region;

the first pole piece having a ferromagnetic pedestal in the front region and a back gap component in the back gap region;

the first coil layer being located between the pedestal and the back gap component of the first pole piece;

a dielectric second insulation layer insulating the first coil layer;

the pedestal and back gap components of the first pole piece, the first coil layer and the second insulation layer forming a first coplanar surface;

the write gap layer being located on and interfacing the first coplanar surface between the pedestal and the sole tip component;

the second pole piece having a ferromagnetic back gap component magnetically connected to the back gap component of the first pole piece;

the first insulation layer being located on the write gap layer between the pole tip and back gap components of the second pole piece;

the pole tip and back gap components of the second pole piece and the first insulation layer forming a second coplanar surface which extends throughout an entirety of a space between the pole tip and back gap components; and the second coil layer being located on and interfacing said second coplanar surface.

2. A magnetic head assembly as claimed in claim 1 including:

the second pole piece having a ferromagnetic second pole piece structure that is magnetically connected to the pole tip and back gap components of the second pole piece and that extends across the second coil layer; and a dielectric third insulation layer insulating the second coil layer from the second pole piece structure.

3. A magnetic head assembly as claimed in claim 2 wherein the second pole piece structure is a single layer.

4. A magnetic head assembly as claimed in claim 3 further including:

a read sensor;

nonmagnetic nonconductive first and second read gap layers; the read sensor being located between the first and second read gap layers;

a ferromagnetic first shield layer; and the first and second read gap layers being located between the first shield layer and the first coil layer.

5. A magnetic head assembly, having a yoke region between front and back gap regions wherein the front region terminates at an air bearing surface (ABS), comprising:

first and second pole pieces;

first and second coil layers in the yoke region;

the second pole piece having a ferromagnetic pole tip component which forms a portion of the ABS and defines a track width of a write head;

a write gap layer located between the first pole piece and the pole tip component;

a dielectric first insulation layer interfacing first and second side surfaces and a back surface of the pole tip component and located between the first and second coil layers; and the second pole piece having a ferromagnetic second pole piece structure extending across the second coil layer and magnetically connected to the pole tip component in the front region and the first pole piece in the back gap region;

the first pole piece having a ferromagnetic pedestal in the front region and a back gap component in the back gap region;

the first coil layer being located between the pedestal and the back gap component of the first pole piece;

a dielectric second insulation layer insulating the first coil layer;

the pedestal and back gap components of the first pole piece, the first coil layer and the second insulation layer forming a first coplanar surface;

the write gap layer being located between the pedestal and the pole tip component;

the second vole piece haying a ferromagnetic back gap component magnetically connected to the back gap component of the first pole piece;

the first insulation layer being located between the vole tip and back gap components of the second pole piece;

the pole tip and back gap components of the second pole piece and the first insulation layer forming a second coplanar surface;

the second pole piece having a ferromagnetic second pole piece structure that is magnetically connected to the pole tip and back gap components of the second pole piece and that extends across the second coil layer;

a dielectric third insulation layer insulating the second coil layer from the second pole piece structure;

the second pole piece structure having a ferromagnetic yoke between a ferromagnetic front component in the front region and a ferromagnetic back gap component in the back gap region;

the front and back gap components of the second pole piece structure being magnetically coupled to the pole tip and back gap components respectively of the second pole piece;

the front and back gap components of the second pole piece structure and the third insulation layer forming a third coplanar surface; and the yoke extending across the second coil layer and being magnetically connected to the front and back gap components of the second pole piece structure.

6. A magnetic head assembly as claimed in claim 5 wherein the yoke is a lamination of ferromagnetic and dielectric films.

7. A magnetic head assembly as claimed in claim 6 further including:

a read sensor;

nonmagnetic nonconductive first and second read gap layers; the read sensor being located between the first and second read gap layers;

a ferromagnetic first shield layer; and the first and second read gap layers being located between the first shield layer and the first coil layer.

8. A magnetic disk drive, including a write head and a read head that have an air bearing surface (ABS) and that have a yoke region between front and back gap regions wherein the front region terminates at the ABS, comprising:

the write head including;

first and second pole pieces;

first and second coil layers in the yoke region;

the second pole piece having a ferromagnetic pole tip component which forms a portion of the ABS and defines a track width of a write head;

a write gap layer located between the first pole piece and the pole tip component;

a dielectric first insulation layer interfacing first and second side surfaces and a back surface of the pole tip component and located between the first and second coil layers;

the second pole piece having a ferromagnetic second pole piece structure extending across the second coil layer and magnetically connected to the pole tip component in the front region and the first pole piece in the back gap region;

the first pole piece having a ferromagnetic pedestal in the front region and a back gap component in the back gap region;

the first coil layer being located between the pedestal and the back gap component of the first pole piece;

a dielectric second insulation layer insulating the first coil layer;

the pedestal and back gap components of the first pole piece, the first coil layer and the second insulation layer forming a first coplanar surface;

the write gap layer being located between the pedestal and the pole tip component;

the second pole piece having a ferromagnetic back gap component magnetically connected to the back gap component of the first pole piece;

the first insulation layer being located between the pole tip and back gap components of the second pole piece;

the pole tip and back gap components of the second pole piece and the first insulation layer forming a second coplanar surface;

the read head including;
  a sensor;
  nonmagnetic nonconductive first and second read gap layers;
  the sensor being located between the first and second read gap layers;
  a ferromagnetic first shield layer; and
  the first and second read gap layers being located between the first shield layer and the first pole piece layer;

a housing;

a magnetic disk rotatably supported in the housing;

a support mounted in the housing for supporting the magnetic head assembly with said ABS facing the magnetic disk so that the magnetic head assembly is in a transducing relationship with the magnetic disk;

a spindle motor for rotating the magnetic disk;

an actuator positioning means connected to the support for moving the magnetic head to multiple positions with respect to said magnetic disk; and a processor connected to the magnetic head to the spindle motor and to the actuator for exchanging signals with the magnetic head, for controlling movement of the magnetic disk and for controlling the position of the magnetic head.

9. A magnetic disk drive as claimed in claim 8 including:
the second pole piece having a ferromagnetic second pole piece structure that is magnetically connected to the pole tip and back gap components of the second pole piece and that extends across the second coil layer; and
a dielectric third insulation layer insulating the second coil layer from the second pole piece structure.

10. A magnetic disk drive as claimed in claim 9 wherein the second pole piece structure is a single layer.

11. A magnetic disk drive, including a write head and a read head that have an air bearing surface (ABS) and that have a yoke region between front and back gap regions wherein the front region terminates at the ABS, comprising:
  the write head including:
    first and second pole pieces;
    first and second coil layers in the yoke region;
    the second pole piece having a ferromagnetic pole tip component which forms a portion of the ABS and defines a track width of a write head;
    a write gap layer located between the first pole piece and the pole tip component;
    a dielectric first insulation layer interfacing first and second side surfaces and a back surface of the pole tip component and located between the first and second coil layers; and
    the second pole piece having a ferromagnetic second pole piece structure extending across the second coil layer and magnetically connected to the pole tip component in the front region and the first pole piece in the back gap region;

the read head including:
    a sensor;
    nonmagnetic nonconductive first and second read gap layers;
    the sensor being located between the first and second read gap layers;
    a ferromagnetic first shield layer; and
    the first and second read gap layers being located between the first shield layer and the first pole piece layer;
    the first pole piece having a ferromagnetic pedestal in the front region and a back gap component in the back gap region;
    the first coil layer being located between the pedestal and the back gap component of the first pole piece;
    a dielectric second insulation layer insulating the first coil layer;
    the pedestal and back gap components of the first pole piece, the first coil layer and the second insulation layer forming a first coplanar surface;
    the write gap layer being located between the pedestal and the role tip component;
    the second pole piece having a ferromagnetic back gap component magnetically connected to the back gap component of the first pole piece;
    the first insulation layer being located between the role tip and back gap components of the second pole piece;
    the pole tip and back gap components of the second pole piece and the first insulation layer forming a second coplanar surface;
    the second pole piece having a ferromagnetic second pole piece structure that is magnetically connected to the pole tip and back gap components of the second pole piece and that extends across the second coil layer;
    a dielectric third insulation layer insulating the second coil layer from the second pole piece structure;
    the second pole piece structure having a ferromagnetic yoke between a ferromagnetic front component in the front region and a ferromagnetic back gap component in the back gap region;
    the front and back gap components of the second pole piece structure being magnetically coupled to the pole tip and back gap components respectively of the second pole piece;
    the front and back gap components of the second pole piece structure and the third insulation layer forming a third coplanar surface; and
    the yoke extending across the second coil layer and being magnetically connected to the front and back gap components of the second pole piece structure and a housing;
  a magnetic disk rotatably supported in the housing;
    a support mounted in the housing for supporting the magnetic head assembly with said ABS facing the magnetic disk so that the magnetic head assembly is in a transducing relationship with the magnetic disk;
    a spindle motor for rotating the magnetic disk;
    an actuator positioning means connected to the support for moving the magnetic head to multiple positions with respect to said magnetic disk;
    a processor connected to the magnetic head to the spindle motor and to the actuator positioning means for exchanging signals with the magnetic head, for controlling movement of the magnetic disk and for controlling the position of the magnetic head.

12. A magnetic disk drive as claimed in claim 11 wherein the yoke is a lamination of ferromagnetic and dielectric films.

13. A magnetic head assembly partially bounded by a top surface, a U bottom surface and a front surface that forms a portion of an air bearing surface comprising:
- first and second pole pieces;
- the first pole piece having a ferromagnetic first pole piece layer having front, middle and back portions with the middle portion located between front and back portions;
- the first pole piece further having a ferromagnetic pedestal magnetically coupled to the front portion of the first pole piece layer and a ferromagnetic back gap component magnetically coupled to the back portion of the first pole piece layer with the middle portion of the first pole piece layer located between the pedestal and the back gap component;
- a dielectric first insulation layer on the middle portion of the first pole piece layer;
- a first coil layer located on the first insulation layer which has spaced apart turns and which is spaced from each of the pedestal and the back gap component;
- a dielectric second insulation layer located between the turns of the first coil layer and between the first coil layer and each of the pedestal and the back gap component;
- the pedestal, the second insulation layer and the back gap component having top surfaces which form a first coplanar surface;
- the first coplanar surface having front, middle and back portions with the middle portion located between front and back portions;
- a nonmagnetic write gap layer located on the front and middle portions of the first coplanar surface;
- the write gap layer having front and rear portions;
- the second pole piece having a ferromagnetic pole tip component which is located on the front portion of the write gap layer and which has a width that defines a track width of the write head;
- the second pole piece further having a ferromagnetic back gap component magnetically coupled to the back gap component of the first pole piece;
- a dielectric third insulation layer located on the rear portion of the write gap layer in a space between the pedestal and the first back gap component of the second pole piece;
- the pole tip component, the third insulation layer and the back gap component of the second pole piece having top surfaces which form a second coplanar surface;
- the second coplanar surface having front, middle and back portions with the middle portion located between the front and back portions;
- a second coil layer located on the middle portion of the second coplanar surface;
- the second pole piece having a second pole piece structure located over the second coil layer and magnetically connected to the pole tip component at the front portion of the second coplanar surface and magnetically connected to the back gap component of the second pole piece at the back portion of the second coplanar surface; and
- a dielectric fourth insulation layer located between the turns of the second coil layer and between the second coil layer and the second pole piece structure.

14. A magnetic head assembly as claimed in claim 13 including:
- the pole tip component having first and second side walls that intersect the ABS; and
- the third insulation layer interfacing the first and second side walls of the pole tip component.

15. A magnetic head assembly as claimed in claim 14 wherein the second pole piece structure is a single layer.

16. A magnetic head assembly as claimed in claim 15 wherein the first coil layer has a top surface that also forms said first coplanar surface.

17. A magnetic head assembly as claimed in claim 16 wherein the second insulation layer is a first film of photoresist covering the first coil layer and a second film of alumina covering the first film.

18. A magnetic head assembly as claimed in claim 17 further including:
- a read sensor;
- nonmagnetic nonconductive first and second read gap layers;
  - the read sensor being located between the first and second read gap layers;
- a ferromagnetic first shield layer; and
- the first and second read gap layers being located between the first shield layer and the first coil layer.

19. A magnetic head assembly as claimed in claim 18 wherein the third insulation layer is entirely alumina.

20. A magnetic head assembly partially bounded by a top surface, a bottom surface and a front surface that forms a portion of an air bearing surface comprising:
- first and second pole pieces;
- the first pole piece having a ferromagnetic first pole piece layer having front, middle and back portions with the middle portion located between front and back portions;
- the first pole piece further having a ferromagnetic pedestal magnetically coupled to the front portion of the first pole piece layer and a ferromagnetic back gap component magnetically coupled to the back portion of the first pole piece layer with the middle portion of the first pole piece layer located between the pedestal and the back gap component;
- a dielectric first insulation layer on the middle portion of the first pole piece layer;
- a first coil layer located on the first insulation layer which has spaced apart turns and which is spaced from each of the pedestal and the back gap component;
- a dielectric second insulation layer located between the turns of the first coil layer and between the first coil layer and each of the pedestal and the back gap component;
- the pedestal the second insulation layer and the back gap component having top surfaces which form a first coplanar surface;
- the first coplanar surface having front, middle and back portions with the middle portion located between front and back portions;
- a nonmagnetic write gap layer located on the front and middle portions of the first coplanar surface;
- the write gap layer having front and rear portions;
- the second pole piece having a ferromagnetic pole tip component which is located on the front portion of the write gap layer and which has a width that defines a track width of the write head;

the second pole piece further having a ferromagnetic back gap component magnetically coupled to the back gap component of the first pole piece;

a dielectric third insulation layer located on the rear portion of the write gap layer in a space between the pedestal and the first back gap component of the second pole piece;

the pole tip component, the third insulation layer and the back gap component of the second pole piece having top surfaces which form a second coplanar surface;

the second coplanar surface having front, middle and back portions with the middle portion located between the front and back portions;

a second coil layer located on the middle portion of the second coplanar surface;

the second pole piece having a second pole piece structure located over the second coil layer and magnetically connected to the pole tip component at the front portion of the second coplanar surface and magnetically connected to the back gap component of the second pole piece at the back portion of the second coplanar surface;

a dielectric fourth insulation layer located between the turns of the second coil layer and between the second coil layer and the second pole piece structure;

the pole tip component having first and second side walls that intersect the ABS; and the third insulation layer interfacing the first and second side walls of the pole tip component;

the second pole piece structure including:
 a ferromagnetic front component magnetically connected to the pole tip component at the front portion of the second coplanar surface and a ferromagnetic back gap component magnetically connected to the back gap component of the second pole piece at the back portion of the second coplanar surface; and
 a ferromagnetic yoke having a front portion magnetically connected to the front component, a back portion magnetically connected to the back gap component of the second pole piece structure and a middle portion extending across and on top of the second coil layer.

21. A magnetic head assembly as claimed in claim 20 wherein the yoke is an entirely flat layer and is laminated with ferromagnetic and dielectric films.

22. A magnetic head assembly as claimed in claim 21 wherein the second insulation layer is a first film of photoresist covering the first coil layer and a second film of alumina covering the first film.

23. A magnetic head assembly as claimed in claim 22 wherein the fourth insulation layer includes a first film of photoresist covering the second coil layer and a second film of alumina covering the first film.

24. A magnetic head assembly as claimed in claim 23 further including:
 a read sensor;
 nonmagnetic nonconductive first and second read gap layers;
 the read sensor being located between the first and second read gap layers;
 a ferromagnetic first shield layer; and
 the first and second read gap layers being located between the first shield layer and the first coil layer.

25. A method of making a magnetic head having an air bearing surface (ABS), comprising:

forming first and second pole pieces;

forming first and second coil layers in the yoke region;

forming the second pole piece with a ferromagnetic pole tip component which forms a portion of the ABS and defines a track width of a write head;

forming a write gap layer between the first pole piece and the pole tip component;

forming a dielectric first insulation layer interfacing first and second side surfaces and a back surface of the pole tip component and located between the first and second coil layers;

forming the second pole piece with a ferromagnetic second pole piece structure extending across the second coil layer and magnetically connected to the pole tip component in the front region and the first pole piece in the back gap region;

forming the first pole piece with a ferromagnetic pedestal in the front region and a back gap component in the back gap region;

forming the first coil layer between the pedestal and the back gap component of the first pole piece;

forming a dielectric second insulation layer insulating the first coil layer;

forming the pedestal and back gap components of the first pole piece, the first coil layer and the second insulation layer defining a first coplanar surface;

forming the write gap layer between the pedestal and the pole tip component;

forming the second pole piece with a ferromagnetic back gap component magnetically connected to the back gap component of the first pole piece;

forming the first insulation layer on the write gap layer between the pole tip and back gap components of the second pole piece;

forming the pole tip and back gap components of the second pole piece and the first insulation layer to define a second coplanar surface which extends throughout an entirety of a space between the pole tip and back gap components; and forming the second coil layer on and interfacing said second coplanar surface.

26. A method as claimed in claim 25 including the steps of:
 forming the second pole piece with a ferromagnetic second pole piece structure that is magnetically connected to the pole tip and back gap components of the second pole piece and that extends across the second coil layer; and
 forming a dielectric third insulation layer insulating the second coil layer from the second pole piece structure.

27. A method as claimed in claim 26 wherein the second pole piece structure is formed as a single layer.

28. A method as claimed in claim 27 including:
 forming the second insulation layer of a first film of photoresist and a second film of alumina; and
 forming the first film of the second insulation layer to protect the first coil layer before forming the pedestal and the back gap component of the first pole piece and forming the second film after forming the pedestal and the back gap component of the first pole piece.

29. A method as claimed in claim 28 wherein the third insulation layer is formed to protect the second coil layer before forming the front and back gap components of the second pole piece structure.

30. A method as claimed in claim 29 further including the steps of:
  forming a read sensor;
  forming nonmagnetic nonconductive first and second read gap layers with the read sensor located between the first and second read gap layers; and
  forming a ferromagnetic first shield layer with the first and second read gap layers being located between the first shield layer and the first coil layer.

31. A method of making a magnetic head, having an air bearing surface (ABS) and having a yoke region between front and back gap regions wherein the front region terminates at the ABS, comprising the steps of:
  forming first and second coil layers in the yoke region;
  forming the second pole piece with a ferromagnetic pole tip component which forms a portion of the ABS and defines a track width of a write head;
  forming a write gap layer between the first pole piece and the pole tip component;
  forming a dielectric first insulation layer interfacing first and second side surfaces and a back surface of the pole tip component and located between the first and second coil layers;
  forming the second pole piece with a ferromagnetic second pole piece structure extending across the second coil layer and magnetically connected to the pole tip component in the front region and the first pole piece in the back gap region;
  forming the first pole piece with a ferromagnetic pedestal in the front region and a back gap component in the back gap region;
  forming the first coil layer between the pedestal and the back a component of the first pole piece;
  forming a dielectric second insulation layer insulating the first coil layer forming the pedestal and back gap components of the first pole piece, the first coil layer and the second insulation layer defining a first coplanar surface;
  forming the write gap layer between the pedestal and the pole tip component;
  forming the second pole piece with a ferromagnetic back gap component magnetically connected to the back gap component of the first pole piece;
  forming the first insulation layer between the pole tip and back gap components of the second pole piece;
  forming the pole tip and back gap components of the second pole piece and the first insulation layer to define a second coplanar surface;
  forming the second pole piece with a ferromagnetic second pole piece structure that is magnetically connected to the pole tip and back gap components of the second pole piece and that extends across the second coil layer;
  forming a dielectric third insulation layer insulating the second coil layer from the second pole piece structure;
  forming the second pole piece structure with a ferromagnetic yoke between a ferromagnetic front component in the front region and a ferromagnetic back gap component in the back gap region;
  forming the front and back gap components of the second pole piece structure magnetically coupled to the pole tip and back gap components respectively of the second pole piece;
  forming the front and back gap components of the second pole piece structure and the third insulation layer to define a third coplanar surface; and
  forming the yoke across the second coil layer and magnetically connecting it to the front and back gap components of the second pole piece structure.

32. A method as claimed in claim 31 including:
  forming the second insulation layer of a first film of photoresist and a second film of alumina; and
  forming the first film of the second insulation layer to protect the first coil layer before forming the pedestal and the back gap component of the first pole piece and forming the second film after forming the pedestal and the back gap component of the first pole piece.

33. A method as claimed in claim 32 including:
  forming the third insulation layer of a first film of photoresist and a second film of alumina; and
  forming the first film of the third insulation layer to protect the second coil layer before forming the front and back gap components of the second pole piece structure and forming the second film after forming the front and back gap components of the second pole piece structure.

34. A method as claimed in claim 33 wherein the yoke is formed as a lamination of ferromagnetic and dielectric films.

35. A method as claimed in claim 34 further including the steps of:
  forming a read sensor;
  forming nonmagnetic nonconductive first and second read gap layers with the read sensor located between the first and second read gap layers; and
  forming a ferromagnetic first shield layer with the first and second read gap layers being located between the first shield layer and the first coil layer.

36. A method of making a magnetic head partially bounded by a top surface, a bottom surface and a front surface that forms a portion of an air bearing surface comprising the steps of:
  forming first and second pole pieces;
  the first pole piece being formed with a ferromagnetic first pole piece layer having front, middle and back portions with the middle portion located between front and back portions;
  the first pole piece further being formed with a ferromagnetic pedestal magnetically coupled to the front portion of the first pole piece layer and a ferromagnetic back gap component magnetically coupled to the back portion of the first pole piece layer with the middle portion of the first pole piece layer located between the pedestal and the back gap component;
  forming a dielectric first insulation layer on the middle portion of the first pole piece layer;
  forming a first coil layer on the first insulation layer with spaced apart turns and spaced from each of the pedestal and the back gap component;
  forming a dielectric second insulation layer between the turns of the first coil layer and between the first coil layer and each of the pedestal and the back gap component;
  forming the pole tip pedestal, the second insulation layer and the back gap component with top surfaces which form a first coplanar surface with the first coplanar surface having front, middle and back portions with the middle portion located between front and back portions;
  forming a nonmagnetic write gap layer on the front and middle portions of the first coplanar surface with the write gap layer having front and rear portions;

forming the second pole piece with a ferromagnetic pole tip component which is located on the front portion of the write gap layer and which has a width that defines a track width of a write head;

further forming the second pole piece with a ferromagnetic back gap component magnetically coupled to the back gap component of the first pole piece;

forming a dielectric third insulation layer on the rear portion of the write gap layer in a space between the pedestal and the first back gap component of the second pole piece;

forming the pole tip component, the third insulation layer and the back gap component of the second pole piece having top surfaces which form a second coplanar surface with the second coplanar surface having front, middle and back portions with the middle portion located between the front and back portions;

forming a second coil layer located on the middle portion of the second coplanar surface;

forming the second pole piece with a second pole piece structure over the second coil layer and magnetically connected to the pole tip component at the front portion of the second coplanar surface and magnetically connected to the back gap component of the second pole piece at the back portion of the second coplanar surface; and forming a dielectric fourth insulation layer located between the turns of the second coil layer and between the second coil layer and the second pole piece structure.

37. A method as claimed in claim 36 including the steps of:

forming the pole tip component with first and second side walls that intersect the ABS; and forming the third insulation layer interfacing the first and second side walls of the pole tip component.

38. A method as claimed in claim 37 wherein the second pole piece structure is formed as a single layer.

39. A method as claimed in claim 38 wherein the first coil layer is formed with a top surface that also forms said first coplanar surface.

40. A method as claimed in claim 39 including the steps of:

forming the second insulation layer of a first film of photoresist and a second film of alumina; and forming the first film of the second insulation layer on the first coil layer to protect the first coil layer before forming the pedestal and the back gap component of the first pole piece and forming the second film of the second insulation layer after forming the pedestal and the back gap component of the first pole piece.

41. A method as claimed in claim 40 further including the steps of:

forming a read sensor;

forming nonmagnetic nonconductive first and second read gap layers with the read sensor located between the first and second read gap layers; and forming a ferromagnetic first shield layer with the first and second read gap layers located between the first shield layer and the first coil layer.

42. A method as claimed in claim 41 wherein the third insulation layer is formed entirely of alumina.

43. A method of making a magnetic head partially bounded by a top surface, a bottom surface and a front surface that forms a portion of an air bearing surface comprising the steps of:

forming first and second pole pieces;

the first pole piece being formed with a ferromagnetic first pole piece layer having front, middle and back portions with the middle portion located between front and back portions;

the first pole piece further being formed with a ferromagnetic pedestal magnetically coupled to the front portion of the first pole piece layer and a ferromagnetic back gap component magnetically coupled to the back portion of the first pole piece layer with the middle portion of the first pole piece layer located between the pedestal and the back gap component;

forming a dielectric first insulation layer on the middle portion of the first pole piece layer;

forming a first coil layer on the first insulation layer with spaced apart turns and spaced from each of the pedestal and the back gap component;

forming a dielectric second insulation layer between the turns of the first coil layer and between the first coil layer and each of the pedestal and the back gap component;

forming the pole tip pedestal, the second insulation layer and the back a component with top surfaces which form a first coplanar surface with the first coplanar surface having front, middle and back portions with the middle portion located between front and back portions;

forming a nonmagnetic write gap layer on the front and middle portions of the first coplanar surface with the write gap layer having front and rear portions;

forming the second pole piece with a ferromagnetic pole tip component which is located on the front portion of the write gap layer and which has a width that defines a track width of a write head;

further forming the second pole piece with a ferromagnetic back gap component magnetically coupled to the back gap component of the first pole piece;

forming a dielectric third insulation layer on the rear portion of the write gap layer in a space between the pedestal and the first back gap component of the second pole piece;

forming the pole tip component, the third insulation layer and the back gap component of the second pole piece having top surfaces which form a second coplanar surface with the second coplanar surface having front, middle and back portions with the middle portion located between the front and back portions;

forming a second coil layer located on the middle portion of the second coplanar surface;

forming the second pole piece with a second pole piece structure over the second coil layer and magnetically connected to the pole tip component at the front portion of the second coplanar surface and magnetically connected to the back gap component of the second pole piece at the back portion of the second coplanar surface;

forming a dielectric fourth insulation layer located between the turns of the second coil layer and between the second coil layer and the second pole niece structure;

forming the pole tip component with first and second side walls that intersect the ABS; and forming the third insulation layer interfacing the first and second side walls of the pole tip component;

a making of the second pole piece component including the steps of:

forming a ferromagnetic front component magnetically connected to the pole tip component at the front portion of the second coplanar surface and a ferromagnetic back gap component magnetically connected to the back gap component of the second pole piece at the back portion of the second coplanar surface; and forming a ferromagnetic yoke having a front portion magnetically connected to the front component, a back portion magnetically connected to the back gap component of the second pole piece structure and a middle portion extending across and on top of the second coil layer.

44. A method as claimed in claim 43 wherein the yoke is formed entirely flat.

45. A method as claimed in claim 44 including the steps of:

forming the second insulation layer of a first film of photoresist and a second film of alumina; and forming the first film of the second insulation layer on the first coil layer to protect the first coil layer before forming the pedestal and the back gap component of the first pole piece and forming the second film of the second insulation layer after forming the pedestal and the back gap component of the first pole piece.

46. A method as claimed in claim 45 including the steps of:

forming the fourth insulation layer of a first film of photoresist and a second film of alumina; and forming the first film of the fourth insulation layer on the second coil layer before forming the front and back gap components of the second pole piece structure and forming the second film of the fourth insulation layer on the first film of the fourth insulation layer after forming the front and back gap components of the second pole piece structure.

47. A method as claimed in claim 46 further including:

forming a read sensor;

forming nonmagnetic nonconductive first and second read gap layers with the read sensor located between the first and second read gap layers; and forming a ferromagnetic first shield layer with the first and second read gap layers located between the first shield layer and the first coil layer.

* * * * *

UNITED STATES PATENT AND TRADEMARK OFFICE
CERTIFICATE OF CORRECTION

PATENT NO. : 6,693,769 B2
DATED : February 17, 2004
INVENTOR(S) : Hus et al.

It is certified that error appears in the above-identified patent and that said Letters Patent is hereby corrected as shown below:

Column 12,
Line 58, delete "sole" and substitute therefor -- pole --

Column 13,
Lines 60 and 63, delete "vole" and substitute therefor -- pole --

Column 17,
Line 5, delete "U"

Column 21,
Between lines 13 and 14, insert -- forming first and second pole pieces; --

Signed and Sealed this

Eighth Day of June, 2004

JON W. DUDAS
*Acting Director of the United States Patent and Trademark Office*